(12) United States Patent
El Dokor et al.

(10) Patent No.: US 8,582,866 B2
(45) Date of Patent: Nov. 12, 2013

(54) METHOD AND APPARATUS FOR DISPARITY COMPUTATION IN STEREO IMAGES

(75) Inventors: Tarek El Dokor, Phoenix, AZ (US); Joshua King, Mesa, AZ (US); Jordan Cluster, Tempe, AZ (US); James Edwards Holmes, Mesa, AZ (US)

(73) Assignee: Edge 3 Technologies, Inc., Phoenix, AZ (US)

( * ) Notice: Subject to any disclaimer, the term of this patent is extended or adjusted under 35 U.S.C. 154(b) by 271 days.

(21) Appl. No.: 13/025,055

(22) Filed: Feb. 10, 2011

(65) Prior Publication Data

US 2012/0207388 A1    Aug. 16, 2012

(51) Int. Cl.
*G06K 9/00*    (2006.01)

(52) U.S. Cl.
USPC ........... 382/154; 382/103; 382/282; 382/293; 382/294

(58) Field of Classification Search
USPC ................. 382/100, 103, 154, 282, 293, 294; 345/419; 348/42
See application file for complete search history.

(56) References Cited

U.S. PATENT DOCUMENTS

| | | | |
|---|---|---|---|
| 3,799,147 A | 3/1974 | Adolph et al. | |
| 4,130,881 A | 12/1978 | Haessler et al. | |
| 4,164,320 A | 8/1979 | Irazoqui et al. | |
| 4,237,344 A | 12/1980 | Moore | |
| 4,290,114 A | 9/1981 | Sinay | |
| 4,338,493 A | 7/1982 | Stenhuis et al. | |
| 4,360,345 A | 11/1982 | Hon | |
| 4,455,548 A | 6/1984 | Burnett | |
| 4,489,387 A | 12/1984 | Lamb et al. | |
| 4,731,725 A | 3/1988 | Suto et al. | |
| 4,839,822 A | 6/1989 | Dormond et al. | |
| 4,858,121 A | 8/1989 | Barber et al. | |
| 4,865,549 A | 9/1989 | Sonsteby | |
| 4,922,514 A | 5/1990 | Bergeron et al. | |
| 4,926,495 A | 5/1990 | Comroe et al. | |

(Continued)

FOREIGN PATENT DOCUMENTS

| | | |
|---|---|---|
| JP | 2003-187003 A | 7/2003 |
| WO | WO2006/015229 A2 | 2/2006 |
| WO | WO2008/156876 A1 | 12/2008 |

OTHER PUBLICATIONS

Qingxiong Yang, Liang Wang, Ruigang Yang, Henrik Stewenius and David Nistér, "Stereo Matching with Color-Weighted Correlation, Hierarchical Belief Propagation and Occlusion Handling", IEEE Transactions on Pattern Analysis and Machine Intelligence, vol. 31, Issue 3, 2009, pp. 1-16.*

(Continued)

*Primary Examiner* — Eric Rush
(74) *Attorney, Agent, or Firm* — Gordon Kessler

(57) ABSTRACT

A method and system for generating a disparity map. The method comprises the steps of generating a first disparity map based upon a first image and a second image acquired at a first time, acquiring at least a third image and a fourth image at a second time, and determining one or more portions comprising a difference between one of the first and second images and a corresponding one of the third and fourth images. A disparity map update is generated for the one or more determined portions, and a disparity map is generated based upon the third image and the fourth image by combining the disparity map update and the first disparity map.

7 Claims, 21 Drawing Sheets

(56) References Cited

U.S. PATENT DOCUMENTS

| | | |
|---|---|---|
| 4,945,476 A | 7/1990 | Bodick et al. |
| 4,967,754 A | 11/1990 | Rossi |
| 5,063,522 A | 11/1991 | Winters |
| 5,065,315 A | 11/1991 | Garcia |
| 5,072,383 A | 12/1991 | Brimm et al. |
| 5,077,666 A | 12/1991 | Brimm et al. |
| 5,086,391 A | 2/1992 | Chambers |
| 5,109,399 A | 4/1992 | Thompson |
| 5,122,959 A | 6/1992 | Nathanson et al. |
| 5,193,855 A | 3/1993 | Shamos |
| 5,228,449 A | 7/1993 | Christ et al. |
| 5,253,164 A | 10/1993 | Holloway et al. |
| 5,255,187 A | 10/1993 | Sorensen |
| 5,291,399 A | 3/1994 | Chaco |
| 5,323,444 A | 6/1994 | Ertz et al. |
| 5,339,351 A | 8/1994 | Hoskinson et al. |
| 5,348,008 A | 9/1994 | Bornn et al. |
| 5,379,337 A | 1/1995 | Castillo et al. |
| 5,404,292 A | 4/1995 | Hendrickson |
| 5,410,471 A | 4/1995 | Alyfuku et al. |
| 5,423,061 A | 6/1995 | Fumarolo et al. |
| 5,438,996 A | 8/1995 | Kemper et al. |
| 5,441,047 A | 8/1995 | David et al. |
| 5,454,043 A | 9/1995 | Freeman |
| 5,462,051 A | 10/1995 | Oka et al. |
| 5,471,382 A | 11/1995 | Tallman et al. |
| 5,502,726 A | 3/1996 | Fischer |
| 5,513,993 A | 5/1996 | Lindley et al. |
| 5,516,702 A | 5/1996 | Senyei et al. |
| 5,521,812 A | 5/1996 | Feder et al. |
| 5,536,084 A | 7/1996 | Curtis et al. |
| 5,544,050 A | 8/1996 | Abe et al. |
| 5,544,649 A | 8/1996 | David et al. |
| 5,554,031 A | 9/1996 | Moir et al. |
| 5,581,276 A | 12/1996 | Cipolla et al. |
| 5,590,269 A | 12/1996 | Kruse et al. |
| 5,594,469 A | 1/1997 | Freeman et al. |
| 5,594,638 A | 1/1997 | Iliff |
| 5,594,786 A | 1/1997 | Chaco et al. |
| 5,596,994 A | 1/1997 | Bro |
| 5,630,125 A | 5/1997 | Zellweger |
| 5,636,873 A | 6/1997 | Sonsteby |
| 5,650,995 A | 7/1997 | Kent |
| 5,660,176 A | 8/1997 | Iliff |
| 5,675,372 A | 10/1997 | Aguayo, Jr. et al. |
| 5,682,419 A | 10/1997 | Grube et al. |
| 5,684,860 A | 11/1997 | Milani et al. |
| 5,689,229 A | 11/1997 | Chaco et al. |
| 5,699,441 A | 12/1997 | Sagawa et al. |
| 5,719,918 A | 2/1998 | Serbetciouglu et al. |
| 5,722,418 A | 3/1998 | Bro |
| 5,724,983 A | 3/1998 | Selker et al. |
| 5,734,706 A | 3/1998 | Windsor et al. |
| 5,745,532 A | 4/1998 | Campana, Jr. |
| 5,748,907 A | 5/1998 | Crane |
| 5,754,960 A | 5/1998 | Downs et al. |
| 5,759,044 A | 6/1998 | Redmond |
| 5,761,278 A | 6/1998 | Pickett et al. |
| 5,761,493 A | 6/1998 | Blakeley et al. |
| 5,767,842 A | 6/1998 | Korth |
| 5,787,429 A | 7/1998 | Nikolin, Jr. |
| 5,805,670 A | 9/1998 | Pons et al. |
| 5,809,493 A | 9/1998 | Ahamed et al. |
| 5,822,544 A | 10/1998 | Chaco et al. |
| 5,823,948 A | 10/1998 | Ross, Jr. et al. |
| 5,826,077 A | 10/1998 | Blakeley et al. |
| 5,832,187 A | 11/1998 | Pedersen et al. |
| 5,842,173 A | 11/1998 | Strum et al. |
| 5,844,817 A | 12/1998 | Lobley et al. |
| 5,857,966 A | 1/1999 | Clawson |
| 5,887,069 A | 3/1999 | Sakou et al. |
| 5,901,214 A | 5/1999 | Shaffer et al. |
| 5,902,234 A | 5/1999 | Webb |
| 5,910,987 A | 6/1999 | Ginter et al. |
| 5,912,818 A | 6/1999 | McGrady et al. |
| 5,915,019 A | 6/1999 | Ginter et al. |
| 5,926,526 A | 7/1999 | Rapaport et al. |
| 5,933,780 A | 8/1999 | Connor et al. |
| 5,961,446 A | 10/1999 | Beller et al. |
| 5,962,891 A | 10/1999 | Arai |
| 5,964,700 A | 10/1999 | Tallman et al. |
| 5,986,543 A | 11/1999 | Johnson |
| 5,989,187 A | 11/1999 | Clawson |
| 5,990,865 A | 11/1999 | Gard |
| 5,991,730 A | 11/1999 | Lubin et al. |
| 5,991,751 A | 11/1999 | Rivette et al. |
| 6,002,808 A | 12/1999 | Freeman |
| 6,004,266 A | 12/1999 | Clawson |
| 6,010,451 A | 1/2000 | Clawson |
| 6,022,315 A | 2/2000 | Iliff |
| 6,035,187 A | 3/2000 | Franza |
| 6,040,770 A | 3/2000 | Britton |
| 6,052,574 A | 4/2000 | Smith, Jr. |
| 6,053,864 A | 4/2000 | Clawson |
| 6,058,179 A | 5/2000 | Shaffer et al. |
| 6,072,494 A | 6/2000 | Nguyen |
| 6,074,345 A | 6/2000 | van Oostrom et al. |
| 6,075,895 A | 6/2000 | Qiao et al. |
| 6,076,065 A | 6/2000 | Clawson |
| 6,078,894 A | 6/2000 | Clawson et al. |
| 6,106,459 A | 8/2000 | Clawson |
| 6,112,083 A | 8/2000 | Sweet et al. |
| 6,115,482 A | 9/2000 | Sears et al. |
| 6,115,646 A | 9/2000 | Fiszman et al. |
| 6,117,073 A | 9/2000 | Jones et al. |
| 6,118,866 A | 9/2000 | Shtivelman |
| 6,127,975 A | 10/2000 | Maloney |
| 6,128,003 A | 10/2000 | Smith et al. |
| 6,134,105 A | 10/2000 | Lueker |
| 6,141,434 A | 10/2000 | Christian et al. |
| 6,147,678 A | 11/2000 | Kumar et al. |
| 6,181,343 B1 | 1/2001 | Lyons |
| 6,195,104 B1 | 2/2001 | Lyons |
| 6,204,852 B1 | 3/2001 | Kumar et al. |
| 6,215,890 B1 | 4/2001 | Matsuo et al. |
| 6,222,465 B1 | 4/2001 | Kumar et al. |
| 6,240,197 B1 | 5/2001 | Christian et al. |
| 6,240,198 B1 | 5/2001 | Rehg et al. |
| 6,252,598 B1 | 6/2001 | Segen |
| 6,256,033 B1 | 7/2001 | Nguyen |
| 6,256,400 B1 | 7/2001 | Takata et al. |
| 6,269,172 B1 | 7/2001 | Rehg et al. |
| 6,292,542 B1 | 9/2001 | Bilder |
| 6,323,942 B1 | 11/2001 | Bamji |
| 6,324,453 B1 | 11/2001 | Breed et al. |
| 6,360,003 B1 | 3/2002 | Doi et al. |
| 6,363,160 B1 | 3/2002 | Bradski et al. |
| 6,370,234 B1 | 4/2002 | Kroll |
| 6,377,238 B1 | 4/2002 | McPheters |
| 6,389,182 B1 | 5/2002 | Ihara et al. |
| 6,394,557 B2 | 5/2002 | Bradski |
| 6,400,830 B1 | 6/2002 | Christian et al. |
| 6,434,255 B1 | 8/2002 | Harakawa |
| 6,442,465 B2 | 8/2002 | Breed et al. |
| 6,456,728 B1 | 9/2002 | Doi et al. |
| 6,478,432 B1 | 11/2002 | Dyner |
| 6,509,707 B2 | 1/2003 | Yamashita et al. |
| 6,512,838 B1 | 1/2003 | Rafii et al. |
| 6,526,156 B1 | 2/2003 | Black et al. |
| 6,535,121 B2 | 3/2003 | Matheny |
| 6,553,296 B2 | 4/2003 | Breed et al. |
| 6,556,708 B1 | 4/2003 | Christian et al. |
| 6,571,193 B1 | 5/2003 | Unuma et al. |
| 6,590,605 B1 | 7/2003 | Eichenlaub |
| 6,600,475 B2 | 7/2003 | Gutta et al. |
| 6,607,481 B1 | 8/2003 | Clawson |
| 6,608,910 B1 | 8/2003 | Srinivasa et al. |
| 6,614,422 B1 | 9/2003 | Rafii et al. |
| 6,624,833 B1 | 9/2003 | Kumar et al. |
| 6,658,136 B1 * | 12/2003 | Brumitt .................. 382/103 |
| 6,674,877 B1 | 1/2004 | Jojic et al. |
| 6,674,895 B2 | 1/2004 | Rafii et al. |
| 6,678,425 B1 | 1/2004 | Flores et al. |
| 6,681,031 B2 | 1/2004 | Cohen et al. |

(56) References Cited

U.S. PATENT DOCUMENTS

| | | |
|---|---|---|
| 6,683,968 B1 | 1/2004 | Pavlovic et al. |
| 6,757,571 B1 | 6/2004 | Toyama |
| 6,766,036 B1 | 7/2004 | Pryor |
| 6,768,486 B1 | 7/2004 | Szabo et al. |
| 6,788,809 B1 | 9/2004 | Grzeszczuk et al. |
| 6,795,567 B1 | 9/2004 | Cham et al. |
| 6,801,637 B2 | 10/2004 | Voronka et al. |
| 6,804,396 B2 | 10/2004 | Higaki et al. |
| 6,829,730 B2 | 12/2004 | Nadeau-Dostie et al. |
| 6,847,728 B2 * | 1/2005 | Tao et al. ............... 382/106 |
| 6,857,746 B2 | 2/2005 | Dyner |
| 6,879,819 B2 | 4/2005 | Brooks |
| 6,901,397 B1 | 5/2005 | Moldenhauer et al. |
| 6,901,561 B1 | 5/2005 | Kirkpatrick et al. |
| 6,931,112 B1 | 8/2005 | McFarland et al. |
| 6,937,742 B2 | 8/2005 | Roberts et al. |
| 6,940,646 B2 | 9/2005 | Taniguchi et al. |
| 6,944,315 B1 | 9/2005 | Zipperer et al. |
| 6,950,534 B2 | 9/2005 | Cohen et al. |
| 6,968,375 B1 | 11/2005 | Brown |
| 6,993,462 B1 | 1/2006 | Pavlovic et al. |
| 7,039,676 B1 | 5/2006 | Day et al. |
| 7,046,232 B2 | 5/2006 | Inagaki et al. |
| 7,050,606 B2 | 5/2006 | Paul et al. |
| 7,050,624 B2 | 5/2006 | Dialameh et al. |
| 7,058,204 B2 | 6/2006 | Hildreth et al. |
| 7,065,230 B2 | 6/2006 | Yuasa et al. |
| 7,068,842 B2 | 6/2006 | Liang et al. |
| 7,095,401 B2 | 8/2006 | Liu et al. |
| 7,102,615 B2 | 9/2006 | Marks |
| 7,106,835 B2 | 9/2006 | Saalsaa |
| 7,129,927 B2 | 10/2006 | Mattsson |
| 7,170,492 B2 | 1/2007 | Bell |
| 7,190,811 B2 | 3/2007 | Ivanov |
| 7,203,340 B2 | 4/2007 | Gorodnichy |
| 7,212,663 B2 | 5/2007 | Tomasi |
| 7,221,779 B2 | 5/2007 | Kawakami et al. |
| 7,224,830 B2 | 5/2007 | Nefian et al. |
| 7,224,851 B2 | 5/2007 | Kinjo |
| 7,233,320 B1 | 6/2007 | Lapstun et al. |
| 7,236,611 B2 | 6/2007 | Roberts et al. |
| 7,239,718 B2 | 7/2007 | Park et al. |
| 7,257,237 B1 | 8/2007 | Luck et al. |
| 7,274,800 B2 | 9/2007 | Nefian et al. |
| 7,274,803 B1 | 9/2007 | Sharma et al. |
| 7,289,645 B2 | 10/2007 | Yamamoto et al. |
| 7,295,709 B2 | 11/2007 | Cootes et al. |
| 7,296,007 B1 | 11/2007 | Funge et al. |
| 7,308,112 B2 | 12/2007 | Fujimura et al. |
| 7,340,077 B2 | 3/2008 | Gokturk et al. |
| 7,340,078 B2 | 3/2008 | Shikano et al. |
| 7,342,485 B2 | 3/2008 | Joehl et al. |
| 7,346,192 B2 | 3/2008 | Yuasa et al. |
| 7,348,963 B2 | 3/2008 | Bell |
| 7,359,529 B2 | 4/2008 | Lee |
| 7,372,977 B2 | 5/2008 | Fujimura et al. |
| 7,379,563 B2 | 5/2008 | Shamaie |
| 7,391,409 B2 | 6/2008 | Zalewski et al. |
| 7,394,346 B2 | 7/2008 | Bodin |
| 7,412,077 B2 | 8/2008 | Li et al. |
| 7,415,126 B2 | 8/2008 | Breed et al. |
| 7,415,212 B2 | 8/2008 | Matsushita et al. |
| 7,421,093 B2 | 9/2008 | Hildreth et al. |
| 7,423,540 B2 | 9/2008 | Kisacanin |
| 7,428,301 B1 | 9/2008 | Clawson |
| 7,436,937 B2 | 10/2008 | Clawson |
| 7,444,001 B2 | 10/2008 | Roberts et al. |
| 7,450,736 B2 | 11/2008 | Yang et al. |
| 7,460,690 B2 | 12/2008 | Cohen et al. |
| 7,477,758 B2 | 1/2009 | Piirainen et al. |
| 7,489,308 B2 | 2/2009 | Blake et al. |
| 7,489,806 B2 | 2/2009 | Mohri et al. |
| 7,499,569 B2 | 3/2009 | Sato et al. |
| 7,512,262 B2 | 3/2009 | Criminisi et al. |
| 7,519,223 B2 | 4/2009 | Dehlin et al. |
| 7,519,537 B2 | 4/2009 | Rosenberg |
| 7,551,770 B2 * | 6/2009 | Harman ............... 382/154 |
| 7,574,020 B2 | 8/2009 | Shamaie |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,599,547 B2 | 10/2009 | Sun et al. |
| 7,606,411 B2 | 10/2009 | Venetsky et al. |
| 7,614,019 B2 | 11/2009 | Rimas Ribikauskas et al. |
| 7,620,316 B2 | 11/2009 | Boillot |
| 7,646,372 B2 | 1/2010 | Marks et al. |
| 7,660,437 B2 | 2/2010 | Breed |
| 7,665,041 B2 | 2/2010 | Wilson et al. |
| 7,676,062 B2 | 3/2010 | Breed et al. |
| 7,720,282 B2 | 5/2010 | Blake et al. |
| 7,721,207 B2 | 5/2010 | Nilsson |
| 7,804,998 B2 | 9/2010 | Mundermann et al. |
| 2001/0030642 A1 | 10/2001 | Sullivan et al. |
| 2002/0004729 A1 | 1/2002 | Zak et al. |
| 2002/0012459 A1 * | 1/2002 | Oh ............... 382/154 |
| 2002/0041327 A1 | 4/2002 | Hildreth et al. |
| 2002/0064382 A1 | 5/2002 | Hildreth et al. |
| 2002/0090133 A1 | 7/2002 | Kim et al. |
| 2002/0106059 A1 | 8/2002 | Kroll et al. |
| 2002/0140633 A1 | 10/2002 | Rafii et al. |
| 2003/0028536 A1 | 2/2003 | Singh et al. |
| 2003/0050538 A1 | 3/2003 | Naghavi et al. |
| 2003/0195394 A1 | 10/2003 | Saalsaa |
| 2003/0212575 A1 | 11/2003 | Saalsaa et al. |
| 2004/0001182 A1 | 1/2004 | Dyner |
| 2004/0183775 A1 | 9/2004 | Bell |
| 2005/0002074 A1 | 1/2005 | McPheters et al. |
| 2005/0083314 A1 | 4/2005 | Shalit et al. |
| 2005/0105775 A1 | 5/2005 | Luo et al. |
| 2005/0190443 A1 | 9/2005 | Nam et al. |
| 2005/0286756 A1 * | 12/2005 | Hong et al. ............... 382/154 |
| 2006/0093186 A1 | 5/2006 | Ivanov |
| 2006/0101354 A1 | 5/2006 | Hashimoto et al. |
| 2006/0122520 A1 | 6/2006 | Banet et al. |
| 2006/0136846 A1 | 6/2006 | Im et al. |
| 2006/0139314 A1 | 6/2006 | Bell |
| 2006/0173500 A1 | 8/2006 | Walker et al. |
| 2006/0178908 A1 | 8/2006 | Rappaport |
| 2006/0221072 A1 | 10/2006 | Se et al. |
| 2007/0055427 A1 | 3/2007 | Sun et al. |
| 2007/0055559 A1 | 3/2007 | Clawson |
| 2007/0112275 A1 | 5/2007 | Cooke et al. |
| 2007/0113207 A1 | 5/2007 | Gritton |
| 2007/0116189 A1 | 5/2007 | Clawson |
| 2007/0132721 A1 | 6/2007 | Glomski et al. |
| 2007/0195997 A1 | 8/2007 | Paul et al. |
| 2007/0201664 A1 | 8/2007 | Salafia et al. |
| 2007/0263932 A1 | 11/2007 | Bernardin et al. |
| 2007/0280505 A1 | 12/2007 | Breed |
| 2008/0002878 A1 | 1/2008 | Meiyappan |
| 2008/0005703 A1 | 1/2008 | Radivojevic et al. |
| 2008/0013793 A1 | 1/2008 | Hillis et al. |
| 2008/0037875 A1 | 2/2008 | Kim et al. |
| 2008/0052643 A1 | 2/2008 | Ike et al. |
| 2008/0059578 A1 | 3/2008 | Albertson et al. |
| 2008/0065291 A1 | 3/2008 | Breed |
| 2008/0069415 A1 | 3/2008 | Schildkraut et al. |
| 2008/0069437 A1 | 3/2008 | Baker |
| 2008/0104547 A1 | 5/2008 | Morita et al. |
| 2008/0107303 A1 | 5/2008 | Kim et al. |
| 2008/0120577 A1 | 5/2008 | Ma et al. |
| 2008/0178126 A1 | 7/2008 | Beeck et al. |
| 2008/0181459 A1 | 7/2008 | Martin et al. |
| 2008/0219501 A1 | 9/2008 | Matsumoto |
| 2008/0219502 A1 | 9/2008 | Shamaie |
| 2008/0225041 A1 | 9/2008 | El Dokor et al. |
| 2008/0229255 A1 | 9/2008 | Linjama et al. |
| 2008/0240502 A1 | 10/2008 | Freedman et al. |
| 2008/0244465 A1 | 10/2008 | Kongqiao et al. |
| 2008/0244468 A1 | 10/2008 | Nishihara et al. |
| 2008/0267449 A1 | 10/2008 | Dumas et al. |
| 2008/0282202 A1 | 11/2008 | Sunday |
| 2009/0006292 A1 | 1/2009 | Block |
| 2009/0027337 A1 | 1/2009 | Hildreth |

(56) References Cited

U.S. PATENT DOCUMENTS

| | | |
|---|---|---|
| 2009/0037849 A1 | 2/2009 | Immonen et al. |
| 2009/0040215 A1 | 2/2009 | Afzulpurkar et al. |
| 2009/0060268 A1 | 3/2009 | Roberts et al. |
| 2009/0074248 A1 | 3/2009 | Cohen et al. |
| 2009/0077504 A1 | 3/2009 | Bell et al. |
| 2009/0079813 A1 | 3/2009 | Hildreth |
| 2009/0080526 A1 | 3/2009 | Vasireddy et al. |
| 2009/0085864 A1 | 4/2009 | Kutliroff et al. |
| 2009/0102788 A1 | 4/2009 | Nishida et al. |
| 2009/0102800 A1 | 4/2009 | Keenan |
| 2009/0103780 A1 | 4/2009 | Nishihara et al. |
| 2009/0108649 A1 | 4/2009 | Kneller et al. |
| 2009/0109036 A1 | 4/2009 | Schalla et al. |
| 2009/0110292 A1 | 4/2009 | Fujimura et al. |
| 2009/0115721 A1 | 5/2009 | Aull et al. |
| 2009/0116742 A1 | 5/2009 | Nishihara |
| 2009/0116749 A1 | 5/2009 | Cristinacce et al. |
| 2009/0150160 A1 | 6/2009 | Mozer |
| 2009/0153366 A1 | 6/2009 | Im et al. |
| 2009/0153655 A1 | 6/2009 | Ike et al. |
| 2009/0180668 A1 | 7/2009 | Jones et al. |
| 2009/0183125 A1 | 7/2009 | Magal et al. |
| 2009/0183193 A1 | 7/2009 | Miller, IV |
| 2009/0189858 A1 | 7/2009 | Lev et al. |
| 2009/0208057 A1 | 8/2009 | Wilson et al. |
| 2009/0222149 A1 | 9/2009 | Murray et al. |
| 2009/0228841 A1 | 9/2009 | Hildreth |
| 2009/0231278 A1 | 9/2009 | St. Hilaire et al. |
| 2009/0244309 A1 | 10/2009 | Maison et al. |
| 2009/0249258 A1 | 10/2009 | Tang |
| 2009/0262986 A1 | 10/2009 | Cartey et al. |
| 2009/0268945 A1 | 10/2009 | Wilson et al. |
| 2009/0273563 A1 | 11/2009 | Pryor |
| 2009/0273574 A1 | 11/2009 | Pryor |
| 2009/0273575 A1 | 11/2009 | Pryor |
| 2009/0278915 A1 | 11/2009 | Kramer et al. |
| 2009/0295738 A1 | 12/2009 | Chiang |
| 2009/0296991 A1 | 12/2009 | Anzola |
| 2009/0315740 A1 | 12/2009 | Hildreth et al. |
| 2009/0316952 A1 | 12/2009 | Ferren et al. |
| 2011/0025827 A1* | 2/2011 | Shpunt et al. ............ 382/154 |
| 2011/0032341 A1* | 2/2011 | Ignatov et al. ........... 348/42 |
| 2011/0081042 A1* | 4/2011 | Kim et al. ............... 382/100 |

OTHER PUBLICATIONS

Freeman, W. T. et al., "The Design and Use of Steerable Filters", *IEEE Transactions of Pattern Analysis and Machine Intelligence V. 13*, (Sep. 1991),891-906.

Simoncelli, E.P. et al., "Shiftable Multi-scale Transforms", *IEEE Transactions on Information Theory V. 38*, (Mar. 1992),587-607.

Simoncelli, E.P. et al., "The Steerable Pyramid: A Flexible Architecture for Multi-Scale Derivative Computation", *Proceedings of ICIP-95 V. 3*, (Oct. 1995),444-447.

Chen, J et al., "Adaptive Perceptual Color-Texture Image Segmentation", *IEEE Transactions on Image Processing, v. 14*, No. 10, (Oct. 2005),1524-1536 (2004 revised draft).

Halfhill, Tom R., "Parallel Processing with CUDA", *Microprocessor Report*, Available at http://www.nvidia.com/docs/IO/55972/220401_Reprint.pdf,(Jan. 28, 2008).

Farber, Rob "CUDA, Supercomputing for the Masses: Part 4, The CUDA Memory Model", *Under the High Performance Computing section of the Dr. Dobbs website*, p. 3 available at http://www.ddj.com/hpc-high-performance-computing/208401741, 3.

Rajko, S et al., "HMM Parameter Reduction for Practice Gesture Recognition", *Proceedings of the International Conference on Automatic Gesture Recognition*, (Sep. 2008).

Hinton, Geoffrey et al., "A Fast Learning Algorithm for Deep Belief Nets", *Neural Computation*, V. 18, 1527-1554.

Susskind, Joshua M., et al., "Generating Facial Expressions with Deep Belief Nets", *Department of Psychology, Univ. of Toronto I-Tech Education and Publishing*, (2008),421-440.

Bleyer, Michael et al., "Surface Stereo with Soft Segmentation.", *Computer Vision and Pattern Recognition. IEEE*, 2010.

Chen, Junqing et al., "Adaptive perceptual color-texture image segmentation.",*The International Society for Optical Engineering, SPIE Newsroom*, (2006),1-2.

Forsyth, David A., et al., "Stereopsis", *In Computer Vision a Modern Approach Prentice Hall*, 2003.

Harris, Mark et al., "Parallel Prefix Sum (Scan) with CUDA", vol. 39, in *GPU Gems 3, edited by Hubert Nguyen*, (2007).

Hirschmuller, Heiko "Stereo Vision in Structured Environments by Consistent Semi-Global Matching", *Computer Vision and Pattern Recognition, CVPR 06*, (2006),2386-2393.

Ivekovic, Spela et al., "Dense Wide-baseline Disparities from Conventional Stereo for Immersive Videoconferencing", *ICPR*. 2004, 921-924.

Kaldewey, Tim et al., "Parallel Search on Video Cards.", *First USENIX Workshop on Hot Topics in Parallelism (HotPar '09)*, (2009).

Kirk, David et al., "Programming Massively Parallel Processors a Hands-on Approach", *Elsevier*, 2010.

Klaus, Andreas et al., "Segment-Based Stereo Matching Using Belief Propagation and a Self-Adapting Dissimilarity Measure", *Proceedings of ICPR 2006. IEEE*, 2006, 15-18.

Kolmogorov, Vladimir et al., "Computing Visual Correspondence with Occlusions via Graph Cuts", *International Conference on Computer Vision.*, 2001.

Kolmogorov, Vladimir et al., "Generalized Multi-camera Scene Reconstruction Using Graph Cuts.", *Proceedings for the International Workshop on Energy Minimization Methods in Computer Vision and Pattern Recognition.*, 2003.

Kuhn, Michael et al., "Efficient ASIC Implementation of a Real-Time Depth Mapping Stereo Vision System", *Proceedings of 2009 IEEE International Conference on Acoustics, Speech and Signal Processing. Taipei, Taiwan: IEEE*, 2009.

Li, Shigang "Binocular Spherical Stereo", *IEEE Transactions on Intelligent Transportation Systems (IEEE)* 9, No. 4 (Dec. 2008), 589-600.

Marsalek, M et al., "Semantic hierarchies for visual object recognition", *Proceedings of IEEE Conference on Computer Vision and Pattern Recognition*, 2007. CVPR '07. MN: IEEE, 2007, 1-7.

Metzger, Wolfgang "Laws of Seeing", *MIT Press*, 2006.

Min, Dongbo et al., "Cost Aggregation and Occlusion Handling With WLS in Stereo Matching", *Edited by IEEE. IEEE Transactions on Image Processing 17* (2008), 1431-1442.

"NVIDIA: CUDA compute unified device architecture, prog. guide, version 1.1", *NVIDIA*, (2007).

Remondino, Fabio et al., "Turning Images into 3-D Models", *IEEE Signal Processing Magazine*, (2008).

Richardson, Ian E., "H.264/MPEG-4 Part 10 White Paper", *White Paper*/www.vcodex.com, (2003).

Sengupta, Shubhabrata "Scan Primitives for GPU Computing", *Proceedings of the 2007 Graphics Hardware Conference. San Diego, CA*, 2007, 97-106.

Sintron, Eric et al., "Fast Parallel GPU-Sorting Using a Hybrid Algorithm", *Journal of Parallel and Distributed Computing (Elsevier)* 68, No. 10, (Oct. 2008),1381-1388.

Wang, Zeng-Fu et al., "A Region Based Stereo Matching Algorithm Using Cooperative Optimization", *CVPR*, (2008).

Wei, Zheng et al., "Optimization of Linked List Prefix Computations on Multithreaded GPUs Using CUDA", *2010 IEEE International Symposium on Parallel & Distributed Processing (IPDPS)*. Atlanta, (2010).

Wiegand, Thomas et al., "Overview of the H.264/AVC Video Coding Standard", *IEEE Transactions on Circuits and Systems for Video Technology 13*, No. 7 (Jul. 2003),560-576.

Woodford, O.J. et al., "Global Stereo Reconstruction under Second Order Smoothness Priors", *IEEE Transactions on Pattern Analysis and Machine Intelligence (IEEE)* 31, No. 12, (2009),2115-2128.

Yang, Qingxiong et al., "Stereo Matching with Color-Weighted Correlation, Hierarchical Belief Propagation, and Occlusion Handling", *IEEE Transactions on Pattern Analysis and Machine Intelligence (IEEE)* 31, No. 3, (Mar. 2009),492-504.

(56) References Cited

OTHER PUBLICATIONS

Zinner, Christian et al., "An Optimized Software-Based Implementation of a Census-Based Stereo Matching Algorithm", *Lecture Notes in Computer Science (SpringerLink)* 5358, (2008),216-227.
"PCT Search report", PCT/US2010/035717, (Sep. 1, 2010),1-29.
"PCT Written opinion", PCT/US2010/035717, (Dec. 1, 2011),1-9.
"PCT Search report", PCT/US2011/49043, (Mar. 21, 2012), 1-4.
"PCT Written opinion", PCT/US2011/49043, (Mar. 21, 2012), 1-4.
"PCT Search report", PCT/US2011/049808, (Jan. 12, 2012), 1-2.
"PCT Written opinion", PCT/US2011/049808, (Jan. 12, 2012), 1-5.
"Non-Final Office Action", U.S. Appl. No. 12/784,123, filed Oct. 2, 2012, 1-20.
"Non-Final Office Action", U.S. Appl. No. 12/784,022, filed Jul. 16, 2012, 1-14.
Tieleman, T et al., "Using Fast weights to improve persistent contrastive divergence", *26th International Conference on Machine Learning* New York, NY ACM, (2009),1033-1040.
Sutskever, I et al., "The recurrent temporal restricted boltzmann machine", *NIPS, MIT Press*, (2008),1601-1608.
Parzen, E "On the estimation of a probability density function and the mode", *Annals of Math. Stats.*, 33, (1962),1065-1076.
Hopfield, J.J. "Neural networks and physical systems with emergent collective computational abilities", *National Academy of Sciences*, 79, (1982),2554-2558.
Culibrk, D et al., "Neural network approach to background modeling for video object segmentation", *IEEE Transactions on Neural Networks*, 18, (2007),1614-1627.
Benggio, Y et al., "Curriculum learning", *ICML 09 Proceedings of the 26th Annual International Conference on Machine Learning*, New York, NY: ACM, (2009).
Benggio, Y et al., "Scaling learning algorithms towards AI. In L. a Bottou", *Large Scale Kernel Machines*, MIT Press,(2007).
Battiato, S et al., "Exposure correction for imaging devices: An overview", In R. Lukac (Ed.), *Single Sensor Imaging Methods and Applications for Digital Cameras*, CRC Press,(2009),323-350.
Radosevich, Lynda, "Network holds sway on life, death," Computerworld, v27 n21, May 24, 1993, 2 pgs.
Harris, Roger, "Updated 911 Phone System Top Concern of Residents," Business First-Louisville, v9 n19 s1, Dec. 1992, 3 pgs.
"Geac Completes Software Install," Wireless Week, Nov. 18, 1996, 3 pgs.
"Dictaphone introduces Windows-based Computer-Aided Dispatch (CAD) system," Business Wire, Apr. 23, 1996, 2 pgs. (in commercial use in 1995).
Holroyd, Brian, et al., "Medical Control; Quality Assurance in Prehospital Care," JAMA, the Journal of American Medical Association, v256, n8, Aug. 1986, p. 1027-1031.
CBS web page News Story entitled "911 Operator: 'It's got to be Hell'", Mar. 31, 2006 (excerpts from 911 operators' actions during the attacks on Sep. 11, 2001), 3 pgs.
Best, Wendy, "999 United Emergency services share life-saving Role to boost response," Western Daily Press, WDP Severnside ed., May 27, 1999, 2 pgs.
Poellmitz, William C., "Wireless technology keeps public safety a step ahead," Nation's Cities Weekly, v21 n17, Apr. 27, 1998, 3 pgs.
Crowley, Mark, "Learning from CAD System Implementation," Communications, v29 n8, Aug. 1992, 5 pgs.
Anonymous, "Suburban Chicago towns centralize 911 services," Communications News, v31 n10, Oct. 1994, 2 pgs.
Office Action Summary from USPTO for U.S. Appl. No. 10/255,901 mailed Dec. 31, 2003, 8 pgs.
Office Action Summary from USPTO for U.S. Appl. No. 10/255,901 mailed Oct. 13, 2004, 8 pgs.
Office Action Summary from USPTO for U.S. Appl. No. 10/255,901 mailed Jun. 29, 2005, 7 pgs.
Advisory Action Before the Filing of an Appeal Brief from USPTO for U.S. Appl. No. 10/255,901 mailed Feb. 14, 2006, 3 pgs.
Office Action Summary from USPTO for U.S. Appl. No. 10/255,901 mailed Jun. 7, 2006, 8 pgs.
Office Action Summary from USPTO for U.S. Appl. No. 10/255,901 mailed Feb. 27, 2007, 8 pgs.
Office Action Summary from USPTO for U.S. Appl. No. 10/255,901 mailed Sep. 6, 2007, 9 pgs.
Office Action Summary from USPTO for U.S. Appl. No. 10/255,905 mailed May 19, 2004, 7 pgs.
Office Action Summary from USPTO for U.S. Appl. No. 10/255,905 mailed May 26, 2005, 5 pgs.
Office Action Summary from USPTO for U.S. Appl. No. 10/255,905 mailed Feb. 9, 2006, 8 pgs.
Advisory Action Before the Filing of an Appeal Brief from USPTO for U.S. Appl. No. 10/255,905 mailed Aug. 11, 2006, 3 pgs.
Office Action Summary from USPTO for U.S. Appl. No. 10/255,905 mailed Jan. 30, 2007, 7 pgs.
Notice of Non-Compliant Amendment (37 CFR 1.121) from USPTO for U.S. Appl. No. 10/255,905 mailed Jul. 9, 2007, 4 pgs.
Office Action Summary from USPTO for U.S. Appl. No. 10/255,905 mailed Oct. 5, 2007, 7 pgs.
Office Action Summary from USPTO for U.S. Appl. No. 09/685,697 mailed Jul. 18, 2003, 8 pgs.
Office Action Summary from USPTO for U.S. Appl. No. 09/685,697 mailed Feb. 3, 2004, 5 pgs.
Office Action Summary from USPTO for U.S. Appl. No. 09/685,697 mailed Jan. 4, 2005, 5 pgs.
Office Action Summary from USPTO for U.S. Appl. No. 09/685,697 mailed Oct. 4, 2005, 7 pgs.
Advisory Action Before the Filing of an Appeal Brief from USPTO for U.S. Appl. No. 09/685,697 mailed Mar. 13, 2006, 4 pgs.
Office Action Summary from USPTO for U.S. Appl. No. 09/685,697 mailed Jun. 26, 2006, 8 pgs.
Office Action Summary from USPTO for U.S. Appl. No. 09/685,697 mailed Apr. 10, 2007, 9 pgs.
Office Action Summary from USPTO for U.S. Appl. No. 09/685,697 mailed Oct. 9, 2007, 11 pgs.
Office Action Summary from USPTO for U.S. Appl. No. 10/140,635 mailed Oct. 3, 2003, 9 pgs.
Office Action Summary from USPTO for U.S. Appl. No. 10/140,635 mailed Jul. 16, 2004, 11 pgs.
Office Action Summary from USPTO for U.S. Appl. No. 10/140,635 mailed Apr. 19, 2005, 11 pgs.
Office Action Summary from USPTO for U.S. Appl. No. 10/140,635 mailed Jan. 17, 2006, 13 pgs.
Office Action Summary from USPTO for U.S. Appl. No. 10/140,635 mailed Sep. 20, 2006, 15 pgs.
Office Action Summary from USPTO for U.S. Appl. No. 10/140,635 mailed Jun. 21, 2007, 15 pgs.
International Search Report for PCT/US2008/054987 filed on Feb. 26, 2008, and mailed on Oct. 8, 2008, 2 pgs.
Written Opinion of the International Searching Authority for PCT/US2008/054987 filed on Feb. 26, 2008, and mailed on Oct. 8, 2008, 9 pgs.
Notification of Transmittal of the International Search Report (2 pgs.) for PCT/US2009/040909, International Search Report, (2 pgs.), and Written Opinion (8 pgs.) mailed from International Seatching Authority on Jun. 10, 2009.
International Search Report and Written Opinion for PCT/US09/48577, International filing date Jun. 25, 2009, mailed from ISA Aug. 7, 2009, 9 pgs.
International Search Report and Written Opinion mailed Jan. 19, 2011 in PCT Application No. PCT/US2010/043308, filed Jul. 27, 2010.
International Search Report and Written Opinion mailed Jan. 19, 2011 in PCT Application No. CT/US2010/043311, filed Jul. 27, 2010.

* cited by examiner

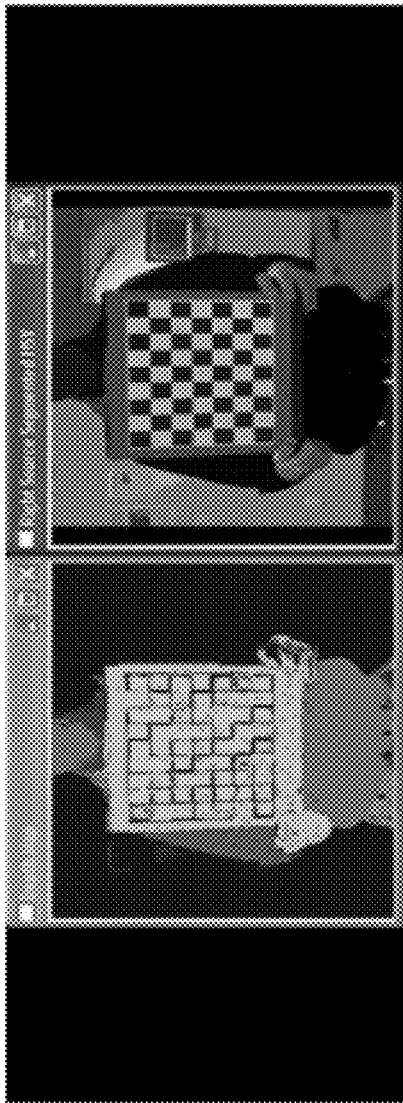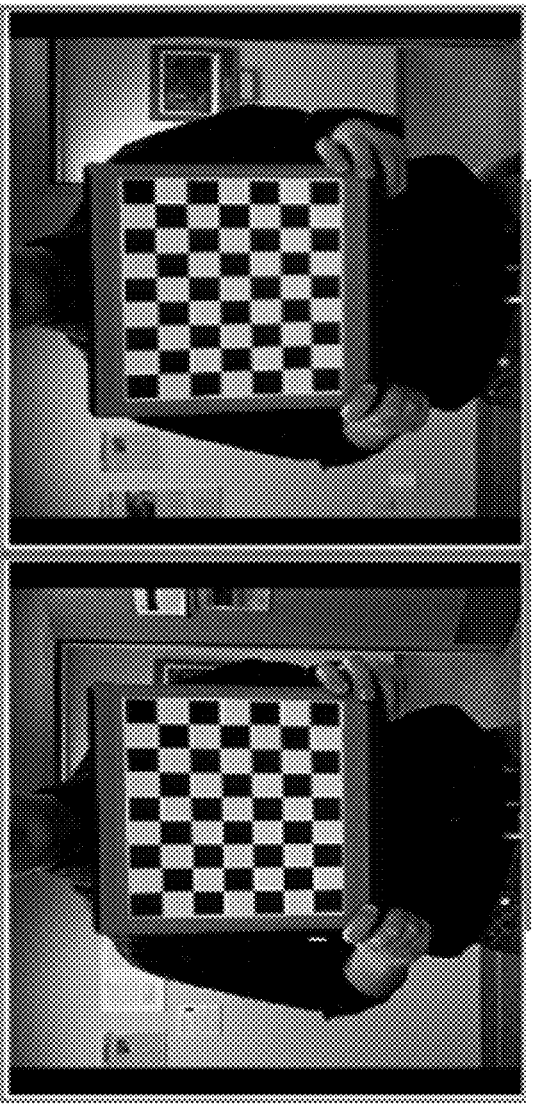
FIGURE 20

METHOD AND APPARATUS FOR DISPARITY COMPUTATION IN STEREO IMAGES

FIELD OF THE INVENTION

This invention relates generally to stereo imaging and more particularly to a new Graphic Processing Unit (GPU)-based stereo algorithm that addresses many difficulties typically associated with stereo imaging. The algorithm is considered as belonging to a family of surface-disparity algorithms, where the scene is treated as a series of slowly-varying surfaces, with homogenized color/texture. The algorithm also preferably includes a real-time component, dubbed residual stereo compute, which addresses real-time constraints and the minimization of compute load in real-time, by only analyzing changes in the image, as opposed to the entire image. Finally, the algorithm also preferably addresses another chronic problem in stereo imaging, aliasing due to texture regions.

BACKGROUND OF THE INVENTION

With the ascent of new parallel computing platforms, such as the use of GPUs, as presented in NVIDIA: CUDA compute unified device architecture, prog. guide, version 1.1, 2007 and various accelerated processing units (APUs), real-time high-quality stereo imaging has become increasingly feasible. GPUs are comprised of a number of threaded Streaming multiprocessors (SMs), each of which is, in turn, comprised of a number of streaming processors (SPs), with example architectures presented in David Kirk and Wen-Mei W. Hwu, *Programming Massively Parallel Processors A Hands-on Approach*: Elsevier, 2010.

The human visual system is very hierarchical, and visual recognition is performed in layers, first by recognizing the most basic features of an image, and then recognizing higher-level combinations of those features. This process continues until the brain recognizes an adequately high-level representation of the visual input. FIG. 1 is a diagram illustrating possible different levels in the visual hierarchy as set forth in M. Marszalek and C. Schmid, "Semantic hierarchies for visual object recognition," in *Proceedings of IEEE Conference on Computer Vision and Pattern Recognition*, 2007. *CVPR '07*, MN, 2007, pp. 1-7. As is shown in FIG. 1, the most basic functions 110 are first recognized by an individual. Thereafter, higher level patterns and clusters 120 are recognized from these clusters 110. Moving up the heirarchy, shapes and segments 130 are recognized from groups of the patterns and clusters. Finally, after many layers of aggregation, one or more complex objects 140 may be recognized by the individual.

There are many different approaches to stereo imaging. In accordance with the present invention, segment-based approaches will be mainly utilized, and may also be referred to as surface stereo. This is because segment-based approaches best resemble the human visual system. Such algorithms are ones in which the 3D field-of-view is treated as a set of smooth, slowly varying surfaces as set forth in Michael Bleyer, Carsten Rother, and Pushmeet Kohli, "Surface Stereo with Soft Segmentation," in *Computer Vision and Pattern Recognition*, 2010. Segment-based approaches have emerged in recent years as an alternative to many region-based and pixel-based approaches and have outperformed in accuracy on the Middlebury dataset almost any other algorithm. The Middlebury set is widely considered the reference dataset and metric for stereo/disparity computation algorithms as set forth in (2010) Middlebury Stereo Vision Page. [Online]. http://vision.middlebury.edu/stereo/.

There are many reasons why such methods today represent the more dominant approaches in stereo imaging, see Andreas Klaus, Mario Sormann, and Konrad Karner, "Segment-Based Stereo Matching Using Belief Propagation and a Self-Adapting Dissimilarity Measure," in *Proceedings of ICPR 2006*, 2006, pp. 15-18. Segment-based approaches address semi-occlusions very well. They are also more robust to local changes. Other pixel and region-based approaches blur edges, causing ambiguity between background and foreground regions, as well as potentially removing smaller objects, as noted in Ines Ernst and Heiko Hirschmuller, "Mutual Information based Semi-Global Stereo Matching on the GPU," in *Lecture Notes in Computer Science*, vol. 5358, 2008, pp. 228-239. A cross-based local approach as set forth in Jiangbo Lu, Ke Zhang, Gauthier Lafruit, and Francky Catthoor, "REAL-TIME STEREO MATCHING: A CROSS-BASED LOCAL APPROACH," in 2009 *IEEE International Conference on Acoustics, Speech and Signal Processing*, 2009 represents an implementation of such approaches on the GPU, but is still impractical because it exhibits weaknesses at regions of high texture and regions with abrupt changes in color/intensity. However, many segment-based approaches are therefore tedious, inaccurate and require a significant amount of computation, even on the GPU.

Therefore, it would be beneficial to provide an improved segment-based approach that overcomes the drawbacks of the prior art.

SUMMARY OF THE INVENTION

Therefore, in accordance with various embodiments of the present invention, an inventive system and method has been developed for disparity estimation in stereo images associated with current stereo algorithms. The implementation of a preferred embodiment of the invention may utilize a GPU or other dedicated processing unit, allowing for significant improvements in performance, both in accuracy and efficiency, but may be employed on any appropriate computing platform.

In accordance with the various embodiments of the present invention, a novel surface/segment-based approach for computing disparity estimation is provided, a real-time approach to computing stereo on the residual image as opposed to the entire image is described, and a means for addressing textured regions, which has been a major drawback of previous stereo algorithms, is finally presented.

Therefore, in accordance with various embodiments of the present invention, the following will be presented:

1. Segment-based disparity decomposition: a new technique for segment-based disparity decomposition, defining a new clustering/segmentation strategy.
2. Segmentation with GPU implementation.
3. Texture-based segmentation and disparity/stereo computation and the concept of texture emergence with disparity computation
4. GPU-based heterogeneous sorting algorithm, and the underlying concept of data reduction
5. APU claim for sorting heterogeneous data through the utilization of the CPU and a number of ALUs, all sharing the fundamental memory architecture
6. Residual compute stereo. Video encoding scheme for residual compute.
7. Stereo on the Bayer pattern, and only demosaicing the residual image
8. Stereo codec associated with Residual Compute stereo Implementation may preferably be on a Graphical Processing Unit (GPU), with comparisons being highlighted with existing methods and other prevalent algorithms for disparity computation. The inventive approach provides a significant improvement over existing depth estimation algorithms. Its preferred GPU-based implementation presents a number of novel interpretations of former algorithms, as well as realizations of new algorithms, ranging from texture segmentation, to disparity computation.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 20 displays results of disparity decomposition on a checkered texture in accordance with an embodiment of the invention.

DETAILED DESCRIPTION OF THE PREFERRED EMBODIMENTS

One or more embodiments of the invention will now be described, making reference to the following drawings in which like reference numbers indicate like structure between the drawings.

Figure 1:
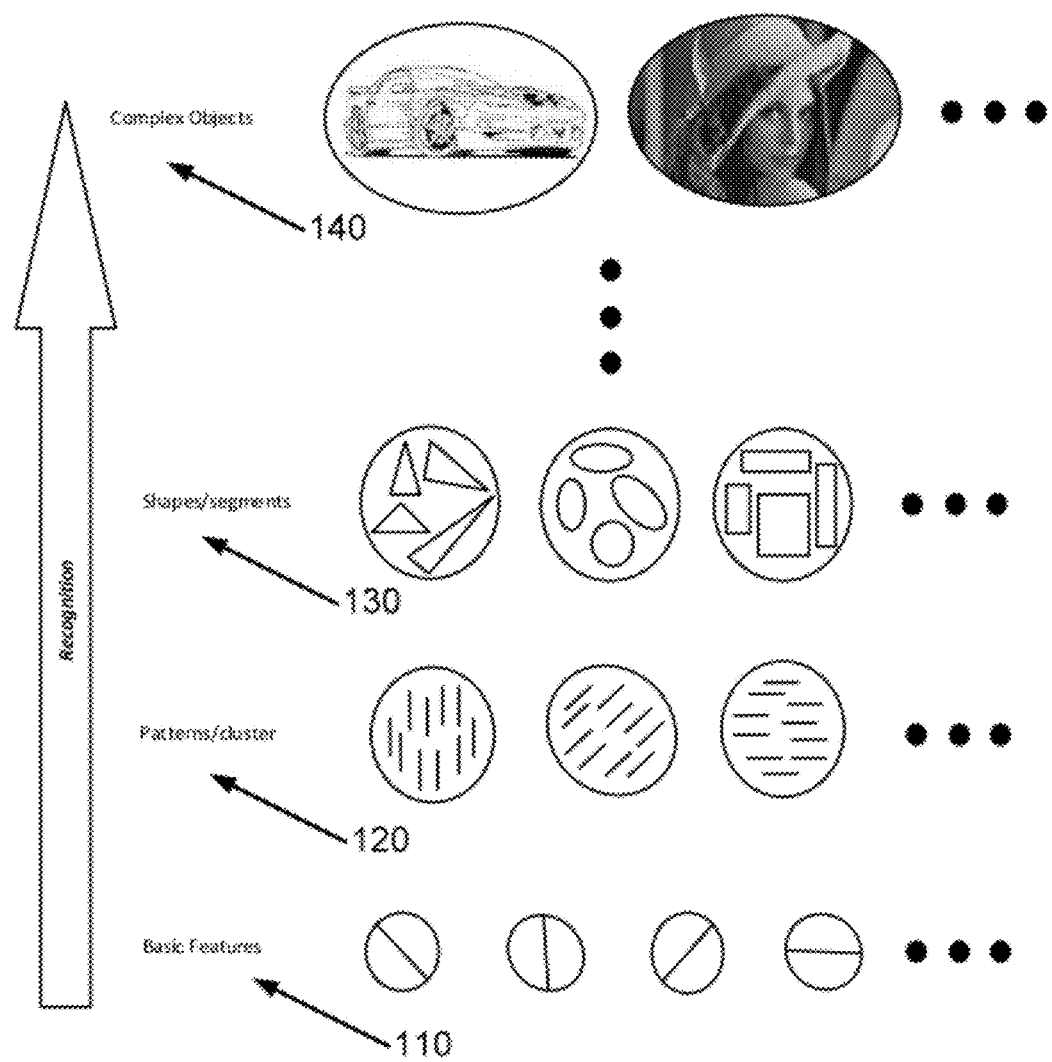
FIG. 1 depicts possible human visual hierarchy levels.
Figure 2:
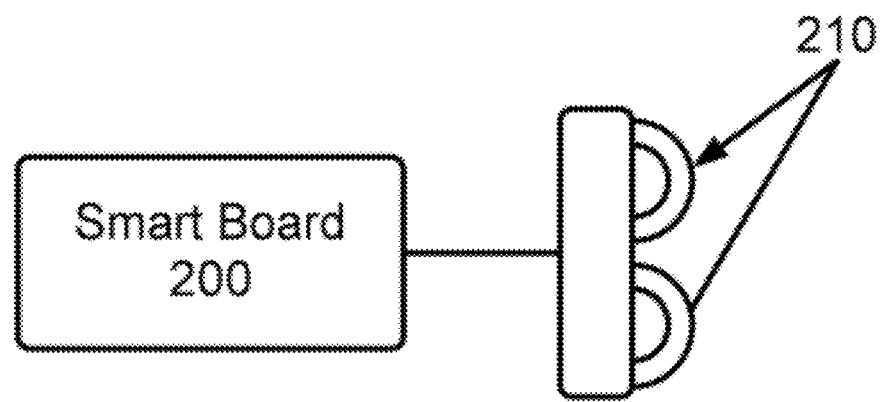
FIG. 2 depicts an example stereo board setup in accordance with an embodiment of the invention.

In accordance with a particular embodiment of the present invention, FIG. 2 depicts a smart processing board 200 coupled with two image sensors 210 that are preferably placed with their rows parallel across an images' epipolar lines. The sensors are preferably gen-locked so that the left and right images are generated at the same time, and calibrated for stereo. The setup itself may comprise either a simple camera connected to a compute device, or a smart camera, in which case, the compute capabilities may also be present on-board the stereo sensor pair. A detailed description of stereo vision fundamentals is set forth in David A. Forsyth and Jean Ponce, "Stereopsis," in *Computer Vision A Modern Approach*: Prentice Hall, 2003.

As is discussed in M. Marszalek and C. Schmid, "Semantic hierarchies for visual object recognition," in *Proceedings of IEEE Conference on Computer Vision and Pattern Recognition*, 2007. CVPR '07, MN, 2007, pp. 1-7, a 3D field-of-view is preferably defined as an ensemble of smooth, well-behaved surfaces, varying slowly over space and time. Constancy in registration lends itself conceptually to spatio-temporal constancy, and allows some simplifying assumptions to be made for scene segmentation, including segment-based robustness as well as integrity across frames. Specifically, if a segment in a reference image is accurately matched to its counterpart in a slave image, then estimating the associated disparity value becomes significantly simplified. Good segmentation, however, poses many challenges, including context, shading, gradient changes, etc. Also, correctly matching the segment is no trivial task. Once a segment is robustly tracked in one image, a real challenge arises in trying to match the tracked segment to a corresponding segment in a second image To ensure a level of constancy, segmentation has to also be maintained over a number of frames (time), so that regions are properly tracked. This simplifies the process of firstly computing the correct disparity, and then tracking the segment's disparity across frames.

The Relevance of Segmentation to Disparity Computation—Segmentation, as part of disparity computation, is very crucial, as it allows for a hierarchical approach to the scene and field-of-view (FOV) organization. This approach has been attempted before, see in David A. Forsyth and Jean Ponce, "Stereopsis," in *Computer Vision A Modern Approach*: Prentice Hall, 2003 and in M. Marszalek and C. Schmid, "Semantic hierarchies for visual object recognition,"

in *Proceedings of IEEE Conference on Computer Vision and Pattern Recognition,* 2007. *CVPR '07,* MN, 2007, pp. 1-7. Two properties, relevant to segments, which are carried across scenes are very important: cluster (or segment) number, and the segment's associated first and second-order moments. The fundamental idea is to track such segments across time (consecutive frames) and across space (reference and left frames). The two properties together comprise spatio-temporal constancy.

Governing principles of disparity generation—Initially, a simplifying assumption may be made that entire segments share a common disparity, again borrowing aspects of the surface-based approach noted in Marszalek noted above. This concept will be utilized to iteratively refine a disparity estimate of what will be considered sub-segments of the actual segment. Rigid segmentation may lead to local inaccuracies, and may fundamentally change depth calculation. The inventive approach in accordance with various embodiments of the present invention assumes that an initial disparity estimate provides for a coarse disparity calculation of a given segment. This disparity measurement may be allocated to all pixels in the segment, including ones that are semi-occluded (not visible by one of the two sensors).

Spatio-Temporal Segmentation and Tracking

One of the main advantages of attempting segmentation employing a GPU or other appropriate processing platform is the ability for Single-Instruction-Multiple Data (SIMD) operations to simultaneously update different regions in an image. This significantly simplifies a set of rules being used during a region-growing phase of segmentation.

The Image as a Cluster Map—Clustering may include one or more aspects as set forth in U.S. patent application Ser. No. 12/784,123, filed May 20, 2010, titled "Gesture Recognition Systems and Related Methods", currently pending, the contents thereof being incorporated herein by reference. Further refinements of this basic system are set forth herein. Therefore, in accordance with embodiments of the present invention, the following processes may be employed.

Every pixel in a frame, i, presented as $p_i(x,y)$, is assigned a cluster number, $c_i(x,y)$, such that:

$$c_i(x,y) = x \cdot y - y \bmod x \qquad \text{Equation 1}$$

In Equation 1, clusters are sequentially numbered left-to-right, and top-to-bottom, such that:

$$c_i(x,y) = c_i(x,y-\epsilon) + \epsilon, \qquad \text{Equation 2}$$

where $\epsilon$ is an integer number. At this stage in the segmentation algorithm, pixels may begin to be connected, such that two pixels $p_i(x,y)$ and $p_i(x+1,y)$ are connected if:

$$p_i(x, y) - p_i(x + 1, y) \leq \tau_p \qquad \text{Equation 3}$$

$$\text{where } p_i(x, y) = \begin{bmatrix} r_i(x, y) \\ g_i(x, y) \\ b_i(x, y) \end{bmatrix}$$

Comprising the three channels, r, g, and b respectively, for a given frame i. A similar implementation has also been developed for HSV-based segmentation. HSV offers a number of perceptually driven properties for segmentation, which may be useful, especially for mitigating issues with shading. This connectivity assigns to the pixels a cluster number that is lowest in its neighborhood. As mentioned earlier, priority is set in descending order, from left to right and from top to bottom. Recall the assumption that all pixels belonging to the same surface are at the same disparity. Surface discontinuities can either refer to a depth discontinuity or a color/texture discontinuity.

Implementation in CUDA—In accordance with the various embodiments of the invention, a key pixel for each cluster is assigned, such that a cluster is defined by that key pixel. Since the implementation is multi-threaded, each pixel in a cluster therefore points to the same pixel to simplify and homogenized the process of tracking clustered/segmented regions. By pointing to the key pixel, clusters preferably have two attributes: 1) a cluster number that is associated with that key pixel, and 2) a stopping criterion, beyond which the cluster is terminated (see implementation above.) The assumption that all pixels belonging to the same surface are at the same disparity value is easily violated without an iterative approach. Specifically, such surfaces have to be further segmented into regions, for more accurate disparity calculation. Surface discontinuities, among other things, can refer to depth discontinuity or a color/texture discontinuity.

Semi-occlusions, Pixels having more than One Disparity Value—Semi-occluded pixels are described in Dongbo Min and Kwanghoon Sohn, "Cost Aggregation and Occlusion Handling With WLS in Stereo Matching," *IEEE Transactions on Image Processing,* vol. 17, pp. 1431-1442, 2008, and Vladimir Kolmogorov and Ramin Zabih, "Computing Visual Correspondence with Occlusions via Graph Cuts," in *International Conference on Computer Vision,* 2001, as pixels that are visible in only one image (from one sensor), but not from the other. Typically, stereo algorithms have difficulty handling semi-occlusions. In accordance with the present invention semi-occlusions are defined as locations that contain more than one disparity value (a left and right-image disparity value), since there is a foreground and a background value associated with the pixel location. It has been determined by the inventors of the present invention that it is very appropriate in such a case to address semi-occlusions with an inspiration from Gestalt—looking at it from a scene organization standpoint. Specifically, if a pixel belongs to a segment, that pixel will take on the segment's disparity value, even if its actual location is semi-occluded in the reference image. This ultimately means that there are two, not one, disparity estimates for semi-occlusions. The one that is relevant to the segment is chosen. A simple example that is inspired by biology, in which our visual system similarly compensates for semi-occlusions, is illustrated by looking at objects that are only partially occluded, and yet our eyes are capable of reconstructing the entire object at the correct depth. A whole school of psychology has evolved around this principle, known as Gestalt theory, in which our brains are described as having the capacity to reconstruct complex forms, from simpler, and sometimes incomplete, constituents, as further described in Vladimir Kolmogorov, Ramin Zabih, and Steven Gortler, "Generalized Multi-camera Scene Reconstruction Using Graph Cuts," in *Proceedings of the International Workshop on Energy Minimization Methods in Computer Vision and Pattern Recognition,* 2003.

Slanted Regions-Iterative Segmentation—For spatially-dominant regions, spanning large areas, in accordance with embodiments of the invention, an iteration may be used in which the segment itself is broken up across both the rows and columns, in essence, further segmenting the clusters into smaller ones, and re-evaluating these smaller clusters. By enforcing over-segmentation in the disparity space, a more refined disparity estimate may be obtained. Segmenting clusters across rows provides for the vertical tilt (or slant) of a cluster, while segmenting across the columns provides for the horizontal tilt (or slant) of a given cluster.

Refining the iteration—Given that iterations may be executed in both the vertical and horizontal directions, these iterations can be combined together to produce one result including both iterations. One possibility is to average both iterations, such that the new estimated disparity is given by Equation 4:

$$\tilde{d}_i(x, y) = \frac{1}{2} d_{irows}(x, y) + \frac{1}{2} d_{icolumns}(x, y)$$

Segmenting Texture—One of the fundamental drawbacks and arguments against stereo imaging has been the performance in regions that are highly-textured. Such regions may contribute to false positives in the disparity computation, since many similarity metrics will confuse regions which look spatially similar. In accordance with embodiments of the present invention, texture segmentation may be approached generatively, in which a texture primitive is in itself comprised of a number of color primitives. First, a look at alternative approaches in texture segmentation is presented to see how they may affect stereo/disparity computation.

Figure 3:
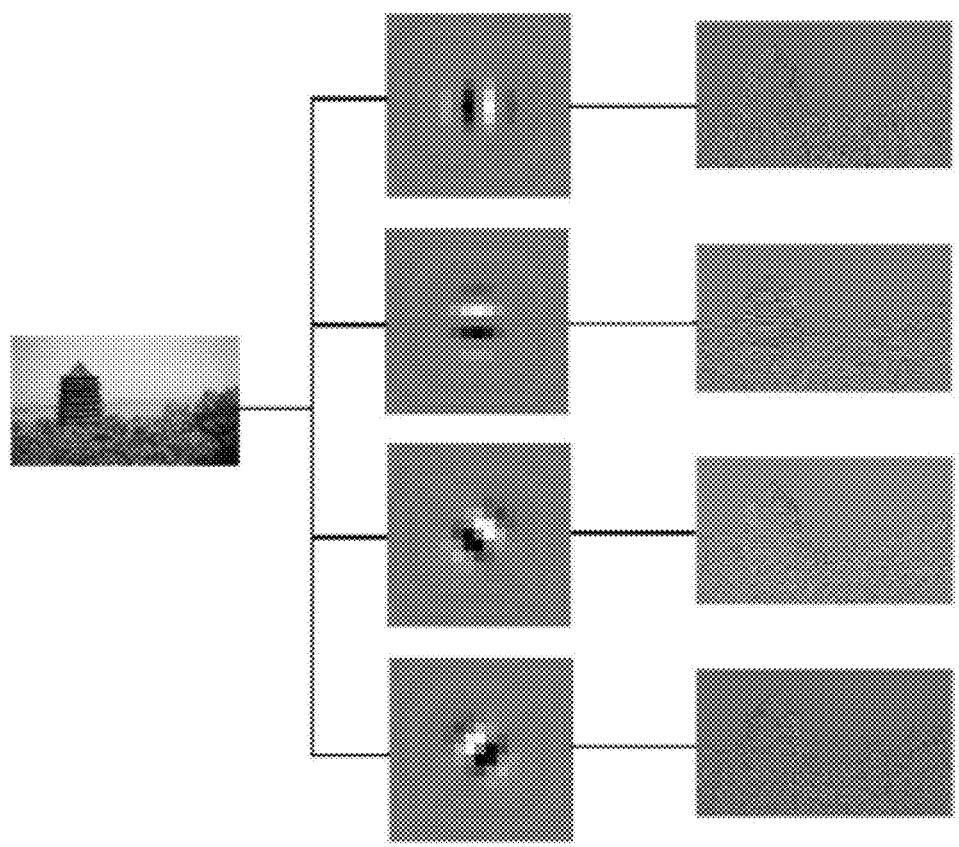
FIG. 3 depicts texture decomposition with a steerable filter bank in accordance with an embodiment of the invention.

Texture, described extensively in the literature, (see Wolfgang Metzger, *Laws of Seeing*: MIT Press, 2006.), is comprised of a fundamental building element, called a texton, or texture primitive. Extracting texture primitives from images is a challenging task and has been the subject of on-going research. Some approaches utilize a Gabor (or wavelet) multi-scale filter bank to decompose a texture into its primitives, establishing spatial periodicity and extracting a texture primitive that can be explicitly expressed. For example, in Metzger, dominant spatial texture orientations of a grayscale version of an image are extracted, and multiscale frequency decomposition is attempted. This is accomplished with a steerable pyramid decomposition process as set forth in Junqing Chen, Pappas T. N., Mojsilovic A., and Rogowitz B. E., "Adaptive perceptual color-texture image segmentation," *IEEE Transactions on Image Processing*, vol. 4, no. 0, pp. 1524-1536, October 2005, in which frequency decomposition is accomplished with four orientation subbands: horizontal, vertical, and the two diagonals, is shown in FIG. 3. Running the input image through the filter bank, the maximum response at each pixel location may be computed. This computation may be performed by calculating the energy at each pixel, defined as the square of the filter response coefficients. A one level decomposition may then be utilized. A pixel location (x,y) may then be classified as belonging to a given texture orientation depending on the maximum response at (x,y) of the filter bank. A composite texture would have more than one strong response from the filter bank.

Computationally, these are very expensive methods, and they make many unrealistic assumptions about knowing a priori dominant orientations which are associated with a texture primitive. Furthermore, such approaches suffer in the presence of a dominant gradient which is associated with the texture, i.e. if the texture has a gradient component that spatially and/or temporally varies. Such approaches negatively impact disparity/stereo computation for two reasons: 1) as mentioned above, regions with similar responses to texture decomposition may behave similarly to a region, or pixel-based similarity metric, and 2) texture segmentation and classification may be computationally prohibitive when combined with stereo, and the rest of the algorithm.

Approaching Texture Segmentation Generatively—Therefore, in accordance with various embodiments of the present invention, a different approach to texture segmentation is preferably employed that is very useful for disparity computation, and adopts the concept of "emergence" from the Gestalt school of psychology, see Vladimir Kolmogorov, Ramin Zabih, and Steven Gortler, "Generalized Multi-camera Scene Reconstruction Using Graph Cuts, in *Proceedings of the International Workshop on Energy Minimization Methods in Computer Vision and Pattern Recognition,* 2003. In accordance with embodiments of the invention, a texton, or texture primitive may be viewed as a set of color primitives, combined together to produce a perceptually consistent spatially periodic or slowly-varying texture primitive, which, in itself, comprises texture. These color primitives define and comprise the texture spatial primitives. Many techniques have been developed to evaluate texture. In accordance with embodiments of the invention, texture is reviewed in the sense of interleaving a series of color primitives through slowly varying them over time. This is a generative approach, in which it is determined how a particular texture is formed in the first place, and then the texture is represented as a weighted linear combination of a color primitive, as well as its gradient that is associated with that color primitive. Pixels belonging to the same color primitive may be clustered independently, such that, for any given texture, a texture primitive is defined as a linear combination of clusters, comprised of these color primitives. A texture primitive, T, over a window, W, may be given by:

$$T_{x,y} = T_{x+\epsilon_1, y+\epsilon_2} \quad \text{Equation 5}$$

Where $\epsilon_1$ and $\epsilon_2$ are values which represent periodicity in the texture primitive.

Also, T is represented by:

$$T_{x,y} = C_0(x,y) + C_1(x,y) + \ldots + C_{N-1}(x,y)$$

where $$\nabla T_{x,y} = \nabla_{C_0} T_{x,y}(x,y) + \nabla_{C_1} T_{x,y}(x,y) + \ldots + \nabla_{C_{N-1}} T_{x,y}(x,y)$$

The gradient associated with the texture represents an N-th order tensor field comprised of the linear combination of all the partials associated with the individual segment changes across a given cluster/segment. One can look at each segment as representing a path or direction.

To successfully compute disparity for textured regions, the inventive approach implicitly mitigates texture by looking at variations in both scale and intensity, as gradual changes in themselves. Together, changes in color, intensity, and lighting, make extracting a texture primitive quite challenging, mainly due to the permutation of combinations that is perceptually easy to identify, yet very difficult to describe in closed form. Instead, the inventive approach is less concerned with defining texture primitives and more concerned with generatively reproducing texture primitives from more fundamental spatially varying primitives. Such primitives constitute interleaving segments that constitute a perceptually-visible texture. This concept extends to address primitives that are disjoint, such as those that may include, for example, a checkerboard pattern as shown in FIG. 20. This runs counter to the idea of the segment being one contiguous set of spatial elements. Such a notion may be violated primarily because once such a segment is robustly identified, it is relatively simple to run disparity calculation on the segment (and hence the number of segments comprising the texture primitive). Once all the segments' disparity values have been calculated (see discussion of on texture-based disparity decomposition, below), then the actual textured region emerges from the disparity map as belonging to a consistent disparity, but is spatially segmented into a number of interleaving segments comprising the texture itself, hence the concept of emergence, mentioned earlier.

To summarize, the underlying concepts governing texture segmentation include 1) Texture color primitives can link up correctly even in the presence of a gradient associated with them, to form a consistent segment; and 2) Interleaving two or more such segments together constitutes texture. Segmentation Rules: as set forth in the Ser. No. 12/784,123 reference noted above, may include 1) the concept of spatio-temporal constancy; 2) the lowest cluster number rule; and 3) that segments ultimately live and die in the field-of-view.

Residual Image Compute-Stereo Codec

This is a computationally expensive algorithm that can be significantly improved for real-time performance in accordance with various embodiments of the invention, in which computation is only performed on the changes in the image, referred to as the residual image. The overall approach requires a similar one to typical video codec encoding schemes, such as the H.264 encoding standard as presented in W. T. Freeman and E. Adelson, "The design and use of steerable filters," *IEEE Transactions on Pattern Analysis and Machine Intelligence*, vol. 13, pp. 891-906, September 1991 or Thomas Wiegand, Gary J. Sullivan, Gisle Bjontegaard, and Ajay Luthra, "Overview of the H.264/AVC Video Coding Standard," *IEEE Transactions on Circuits and Systems for Video Technology*, vol. 13, no. 7, pp. 560-576, July 2003. Such standards have emerged as the new compression standard associated with video codecs. H.264 has flexibility, as a video compression standard, which Metzger allows for real-time gains in bandwidth. H.264 enables this great reduction by exploiting both intra-frame and inter-frame redundancies and reducing the overall compute load required to represent an image.

Figure 4:
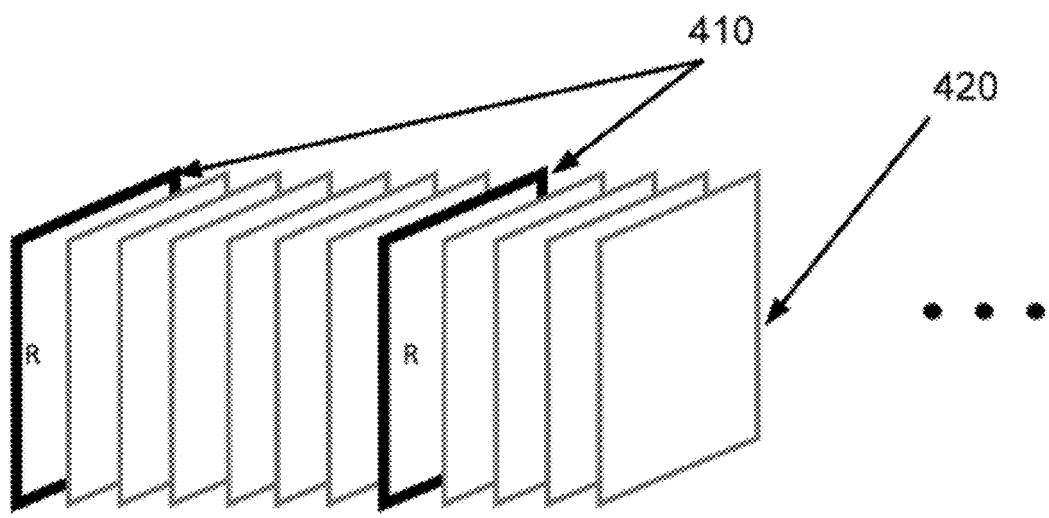
FIG. 4 provides an overview of real-time segmentation in accordance with an embodiment of the invention.

Since changes in a video stream are gradual, an image is mostly unchanged in real-time, transitioning from one frame to another. It is logical to assume in accordance with embodiments of the invention that the FLOPS/computational load would be diminished in real-time, since relatively very few pixels change between frames. As such, a similar method is adopted in accordance with embodiments of the present invention where a reference image I is utilized, and only the residual information between consecutive images is preferably processed in real-time. In H.264, an image is segmented into blocks of non-uniform size. This concept is transferred over in accordance with embodiments of the present invention, utilizing an existing segmented cluster map instead. However, a more complex memory architecture may also be employed, comprised of a reference image, a cluster map, a segmented reference image, and a depth map. In accordance with embodiments of the present invention, a reference memory architecture may be utilized comprised of all these images, and a residual architecture comprised of the difference between these reference images and subsequent images in a video stream. As is shown in FIG. 4, one or more reference frames 410 are shown. In each of these reference frames, a complete segment cluster map is acquired at a resynchronization phase. Each page 420 therebetween comprises a composite frame comprised of temporally stable segments, and more recently computed temporally unstable segments.

Figure 6:
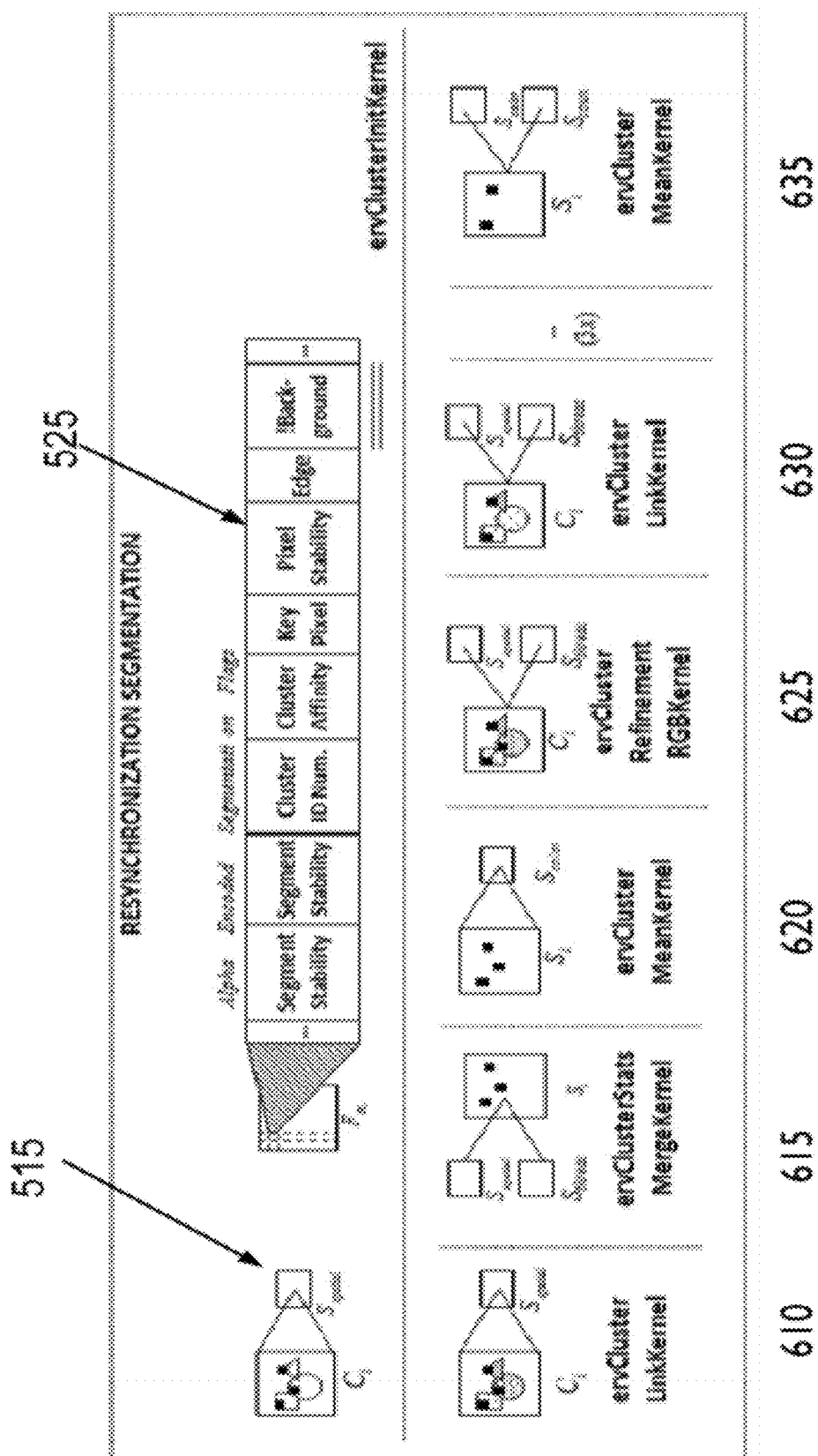
FIG. 6 highlights global memory architecture specific to resynchronization segmentation in accordance with an embodiment of the invention.

In accordance with the present invention, a process for computing the various required valued resembles that suggested for the H.264 and other video encoding schemes. Thus, two main sections are presented: FIG. 6 depicts a resynchronization segmentation portion of the processing. In the section of the algorithm shown in FIG. 6, a series of steps is used to create a stable depth map. FIG. 6 highlights the global memory architecture specific to resynchronization segmentation. At 610, a preliminary clustering step is shown, assigning each non-background pixel (525) a cluster number derived from the pixel's spatial coordinates. At 615, linked pixels are assigned a common cluster number, forming segments that accumulate color and size statistics in two buffers. At 620, separate statistics buffers are merged together, allowing each segment's average color to be computed at 625. The average color is then used to further refine the segmentation at 625, where clusters grow agglomeratively according to color and spatial connectivity. After successive iterations of the clustering process, the final statistics for each segment are computed 630.

Figure 7:
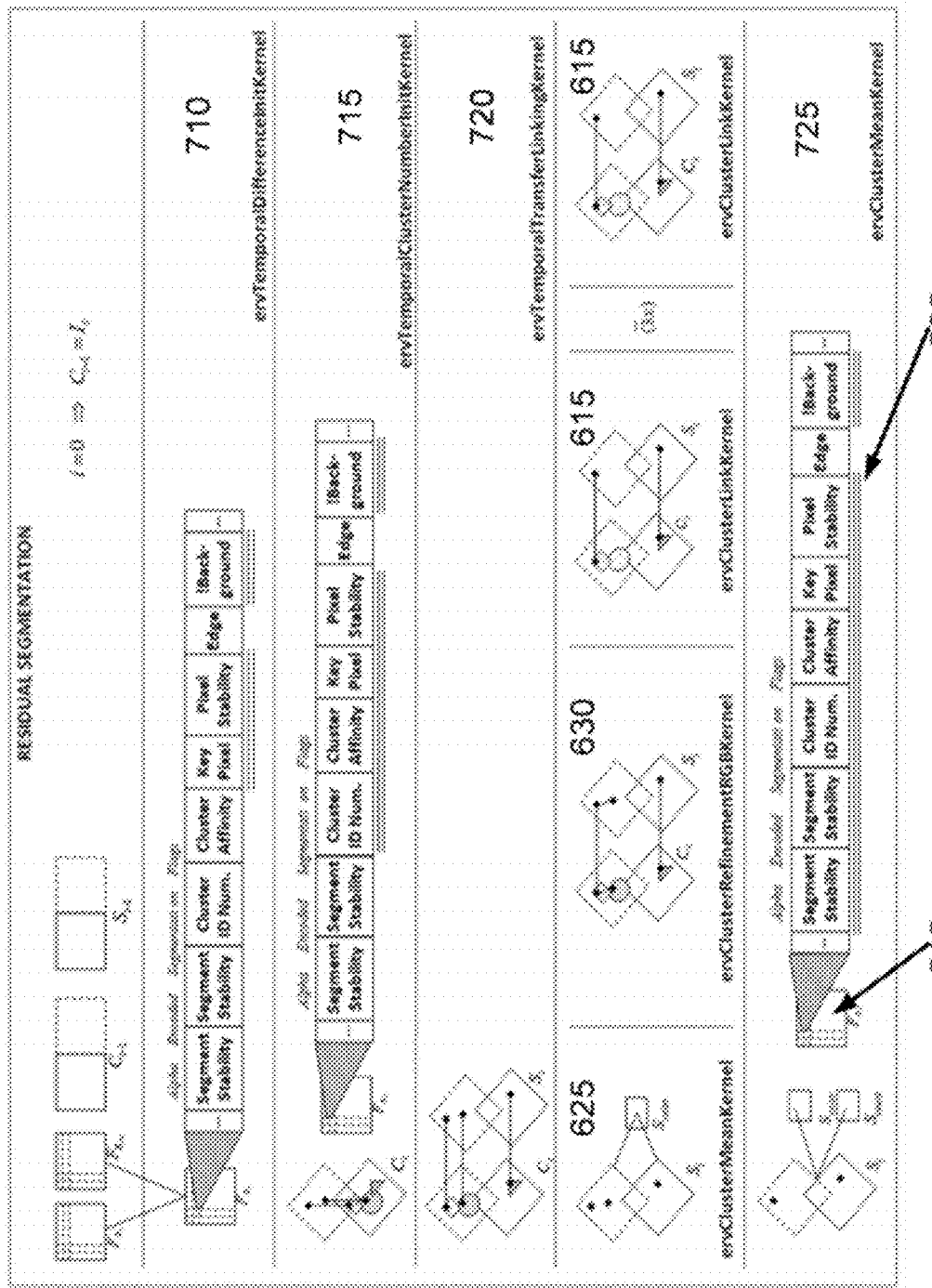
FIG. 7 highlights global memory architecture specific to residual segmentation in accordance with an embodiment of the invention.

The term temporally stable is preferably used to describe segments which have very little change in their overall statistics and depth values. In the section of the algorithm set forth in FIG. 7, a residual compute section looks at the differences between subsequent frames and processes the residuals associated with these frames, enabling a reduced compute load i.e. less compute operations to perform disparity estimation. FIG. 7 highlights the global memory architecture specific to residual segmentation. Drawing on the segmentation flags defined at 525, residual segmentation begins at 710 with temporal differencing to determine pixel stability between the current and previous frames. At 715, unstable residual pixels are assigned new cluster numbers, while key pixels are stabilized, and stable pixels are ignored. At 720, a specialized linking stage is performed to update transitional pixels with a persistent cluster ID. From this point, segmentation continues as defined at 615-625. At 725, the stability of each segment is evaluated to determine if the depth of a segment should be reevaluated.

In accordance with various embodiments of the invention, during the process, starting with a reference, $I_c$ cluster map (see FIG. 7) derived utilizing the standard algorithm presented above, after determining pixels which have changed they can be properly encoded. With that architecture in mind, it is only necessary to examine pixels that are temporally unstable. Once the cluster map is updated by re-initializing the pixels with initial cluster numbers, the rest of the algorithm flows from that step, as will be described below.

Figure 5:
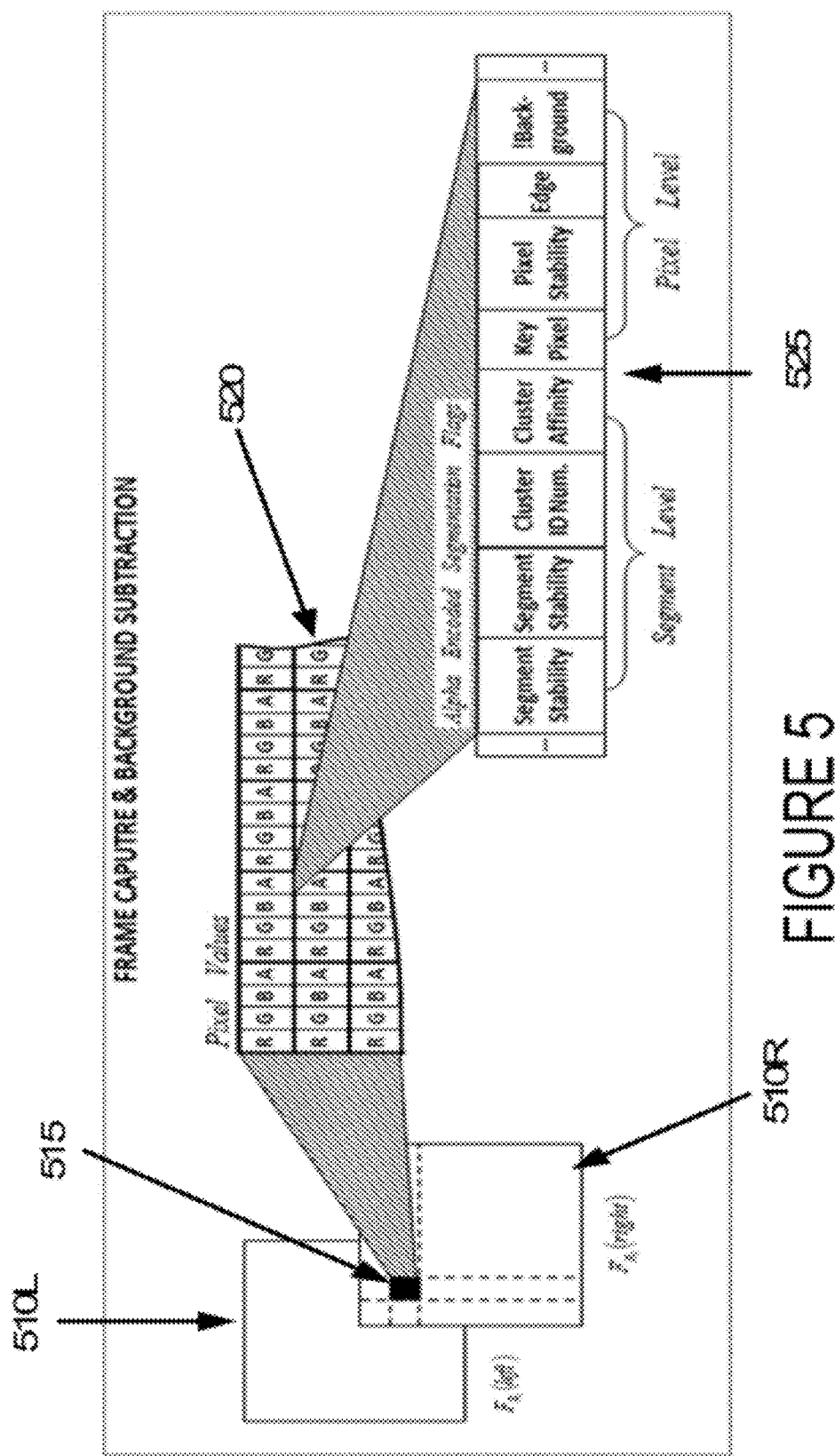
FIG. 5 illustrates the global memory architecture associated with each pixel in a source image in accordance with an embodiment of the present invention.

Associated Pixel Flags and Pixel Memory Architecture—As is next depicted in FIG. 5, an overall architecture of global memory associated with per-pixel allocations is provided. As is shown in FIG. 5, corresponding left and right framed 510L, 510R are shown. Each such frame comprises a plurality of pixels 515. Each pixel 515 further comprises a plurality of RGBA channels 520 associated with the source data. In memory, every pixel is comprised of the R, G, and B channels, as well as an alpha channel (shown as RGB and A segments 520). In this implementation, the alpha channel is used to store a number of flags which are useful for residual compute operations. These segment- and pixel-level encoded flags are shown in FIG. 5 at information 525, as may preferably comprise:

Segment Stability: denotes the temporal stability of the segment that the current pixel is associated with.

Cluster ID Number: denotes the cluster number associated with a the current pixel.

Cluster Affinity Denotes the relationship of the cluster with a key pixel in another cluster.

Key Pixel: denotes whether the current pixel is a key pixel of a cluster or segment.

Temporal Stability: denotes the temporal stability of the current pixel.

Edge: denotes whether the current pixel is an edge pixel.

Edge: another flag for an edge pixel.

!Background: denotes whether the current pixel is not a background pixel.

Note that pixels are background pixels, temporally stable pixels, or temporally unstable pixels.

Segmentation in Real-time—Under real-time conditions, segmentation is only attempted on any temporally unstable residual pixels. Clustering follows that step, such that pixels with common color and spatial proximity are clustered together. Agglomeratively connecting such clusters to previously existing segments is then performed. At this point, any clusters/segments whose size/statistics have been significantly changed undergo disparity decomposition. Such segments are considered unstable, and will have their disparity recomputed. Otherwise, the remaining, stable, segments do not contribute to the residual data, and are part of the reconstructed frame. Disparity decomposition is not performed on temporally stable segments, and instead, a composite depth map is formed, comprised of temporally stable (and thus already pre-computed segments) as well as the computed segments.

Figure 8:
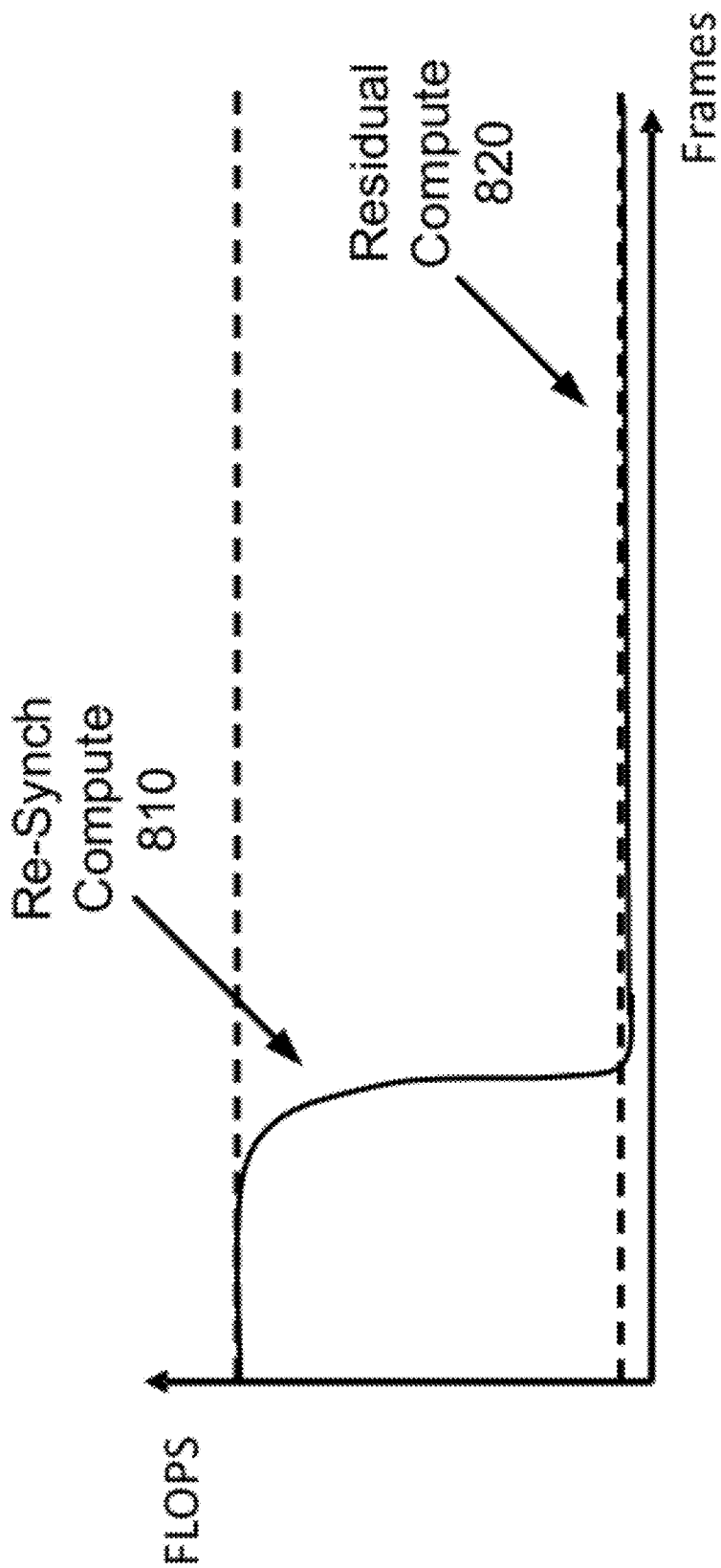
FIG. 8 depicts computation minimization during the transition from resynchronization compute to residual compute in accordance with an embodiment of the invention.

Such an approach to real-time segmentation and depth calculation requires a memory architecture in global memory to support this approach. The architecture proposed in accordance with various embodiments of the present invention contains both reference as well as residual portions, again in a manner similar to typical video codecs such as H.264. This architecture is then utilized at different steps in the analysis to significantly reduce compute load and enhance accuracy. FIG. 8 depicts computation minimization during the transition from resynchronization compute 210 to residual compute 220. As is shown in FIG. 8, the computational burden for resynching frames of an image is substantially higher than that required for the residual computations.

Figure 9:
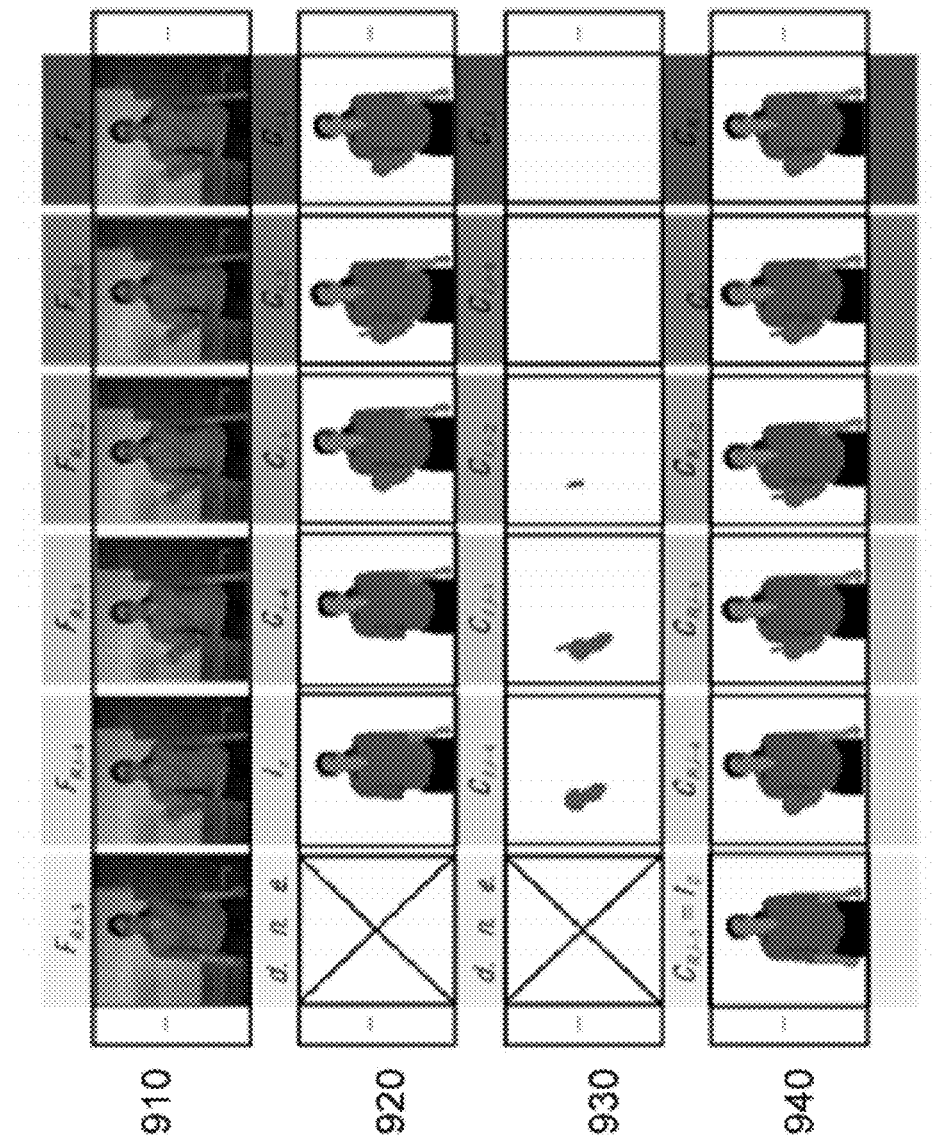
FIG. 9 provides a visual overview of residual segmentation in accordance with an embodiment of the invention.

FIG. 9 provides a visual overview of residual segmentation, beginning from the source image at 910. As is further shown in FIG. 9, the input images shown in row 910 comprise, and may be shown as background pixels, temporally stable non-background pixels (row 920) and temporally unstable pixels (row 930), all being clustered and segmented into a composite image shown in row 940. Row 920 highlights the non-resiudal segments from the previous frame while row 930 highlights the residual segments. The output image, at 940, combines the residual and non-residual segments to create a composite cluster map. Significant gains in compute load are especially useful for enhancing accuracy and enabling iterative updating of depth calculation and refinement, as well as increasing frame rate.

Figure 10:
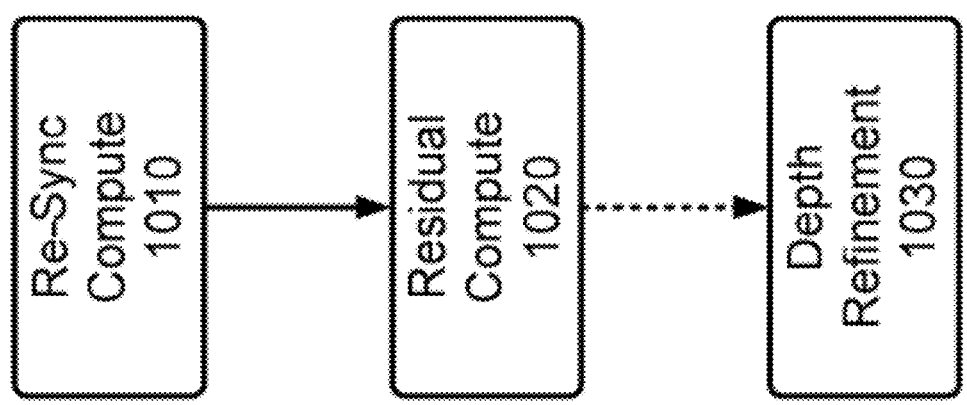
FIG. 10 defines an overall approach to a stereo decomposition algorithm in accordance with an embodiment of the invention.

Thus the following set of guidelines governing segmentation and disparity computation in real-time are realized. If there is no change in the image, the overall FLOPS count should drop very dramatically. Any segment that has significantly changed is deemed temporally unstable and will have its disparity recalculated. The depth map is a composite map comprised of temporally stable segments as well as temporally unstable ones Implementation in CUDA—FIG. 10 depicts a high level approach as to how the algorithm for stereo decomposition with resynchronization compute in accordance with one or more embodiments of the present invention are to be implemented. As is shown in FIG. 10, and in keeping with the above description, a resynchronization compute step 1010 is first implemented, followed by a residual recompute step 1020 to update temporally unstable pixels and clusters in a next frame. Finally, a depth refinement step may optionally be employed at step 1030.

To implement this approach, the inventive architecture accounts for the number of flags noted above that define the stability of the pixels, as well as their relationship to the corresponding clusters and segments. A pixel's cluster number is then assessed; the pixel either receives a new cluster number (cluster number is elevated) if it is temporally unstable, or maintains the same cluster number that is associated with a segment. This enables changes at the pixel level to affect the segment. Conversely, if the segment is found to be temporally stable, all pixels belonging to that segment will have their temporal stability flag updated accordingly, even if the pixels are temporally unstable. Thus, to deem a pixel temporally unstable requires that both the segment stability flag and the pixel stability flag be enabled. Therefore, if a segment is deemed temporally unstable, every pixel in that segment is deemed unstable in spite of the fact that some of them might have been deemed stable earlier in the algorithm.

Figure 11:
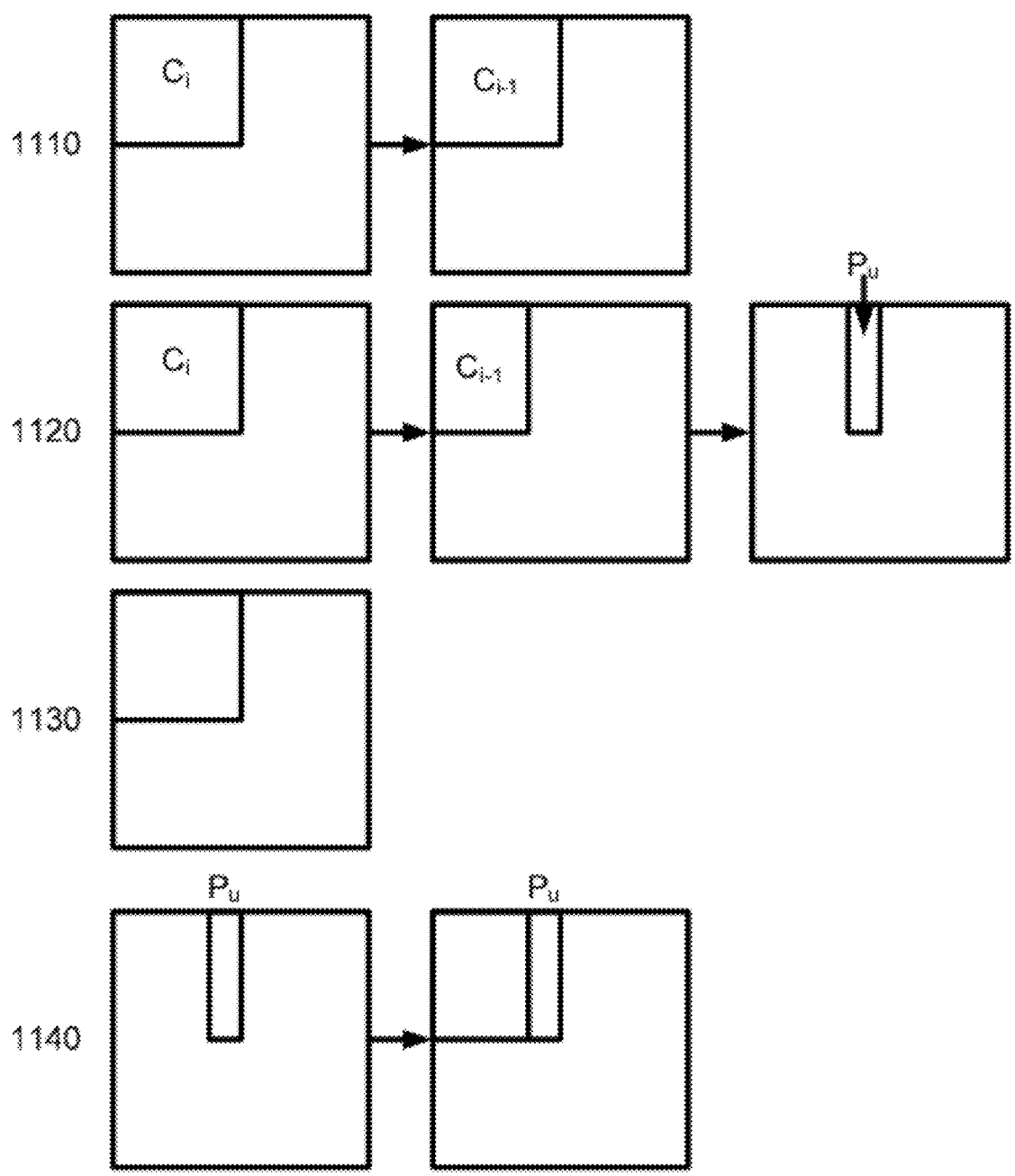
FIG. 11 presents an example implementation of residual compute in accordance with an embodiment of the invention.

FIG. 11 presents an example of this process. As is shown in FIG. 11, in a first step 1110 a previous cluster map $C_i$ from a prior frame is copied to a current cluster map $C_{i-1}$. In a next step 1120, a difference $C_i - C_{i-1}$ is computed to determine one or more temporally unstable pixels $P_u$ between a new current cluster $C_i$ and a prior cluster $C_{i-1}$ from a new prior frame at step 1130, and the key pixel is updated if it is determined in the prior step that the key pixel from the prior frame is now unstable. Finally, the cluster map is updated with residual pixels only at step 1140, by allowing the cluster to merge with all other clusters, effectively merging the determined temporally stable pixels with the determined unstable pixels P.

Computing Residual Statistics—The overall concept of residual-only compute lends itself to one or more statistics calculations for the cluster map, an essential step in segmentation. Because residual statistics are maintained on the block level, a first step utilizes block statistics accumulators, which must be merged after a final refinement iteration. Subsequent stages will occur during residual segmentation to compute statistics solely on temporally unstable pixels. Computing the statistics of a set of data is inherently a serial operation. Many GPU-based implementations associated with statistics are presented in Ian E. G. Richardson, H.264/MPEG-4 Part 10 White Paper, 2003, where a merge-sort implementation is presented. Eric Sintron and Ulf Assarson, "Fast Parallel GPU-Sorting Using a Hybrid Algorithm," *Journal of Parallel and Distributed Computing*, vol. 68, no. 10, pp. 1381-1388, October 2008. Another approach, presented in Sintron and Assarson, utilizes a linked list prefix computations, implemented on GPUs. In Zheng Wei and Joseph Jaja, "Optimization of Linked List Prefix Computations on Multithreaded GPUs Using CUDA," in 2010 *IEEE International Symposium on Parallel & Distributed Processing (IPDPS)*, Atlanta, 2010, a parallel search is presented however, they are mostly aimed at a homogeneous data set, with the idea of starting with a large data set, and then condensing, or reducing the data set with intermediate statistics, until the final statistics are calculated. Other techniques include stream compaction Tim Kaldewey, Jeff Hagen, Andrea Di Blas, and Eric Sedlar, "Parallel Search On Video Cards," in *First USENIX Workshop on Hot Topics in Parallelism (HotPar '09)*, 2009, and scan/scatter algorithms Shubhabrata Sengupta, Mark Harris, Yao Zhang, and John D. Owens, "Scan Primitives for GPU Computing," in *Proceedings of the* 2007 *Graphics Hardware Conference*, San Diego, Calif., 2007, pp. 97-106. Any of these techniques can work for sorting through the clusters and compacting the data into a few segments. In accordance with the invention, support for sort/compaction across multiple portions of the inventive algorithm have been provided, since statistics computation is very critical for real-time implementation. In such a case, a different approach is taken from that presented in the prior art. The compute load that is associated with the statistics is preferably distributed so that a parallel implementation becomes feasible. Note that if APUs are available, an alternative approach could be used in which an X-86 processor (for instance), sharing memory with a number of ALUs, may perform the intermediate calculations. The performance would even be enhanced further in that case because a shared memory CPU does provide an enhanced ability in handling all the relevant serial operations.

Figure 12:
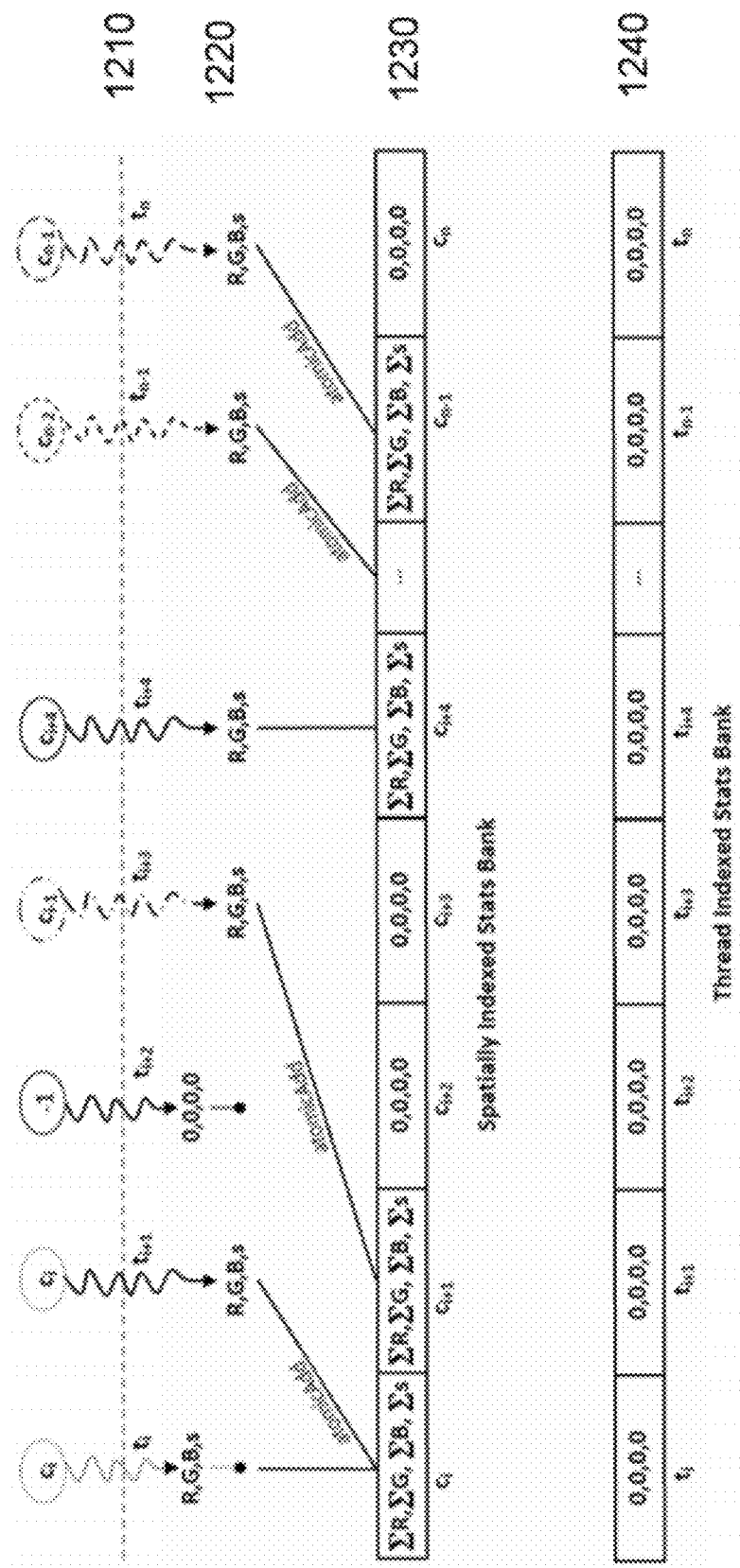
FIG. 12 depicts a first stage of statistics accumulation, which occurs at an end of an initialization kernel in accordance with an embodiment of the invention.

Statistics Implementation—Statistics are first accumulated on the block level into two separate buffers, as is displayed in FIG. 12. FIG. 12 depicts a first stage of statistics accumulation, which occurs at the end of the initialization kernel. In this case, preferably each pixel in the image is assigned a thread 1220, which add the pixel's statistics (red, green, and blue value) to a spatially indexed buffer 1230 at the location indicated by the cluster number 1210. Because initial cluster numbers are defined according to spatial coordinates, the thread indexed buffer 1240 remains empty.

Figure 13:
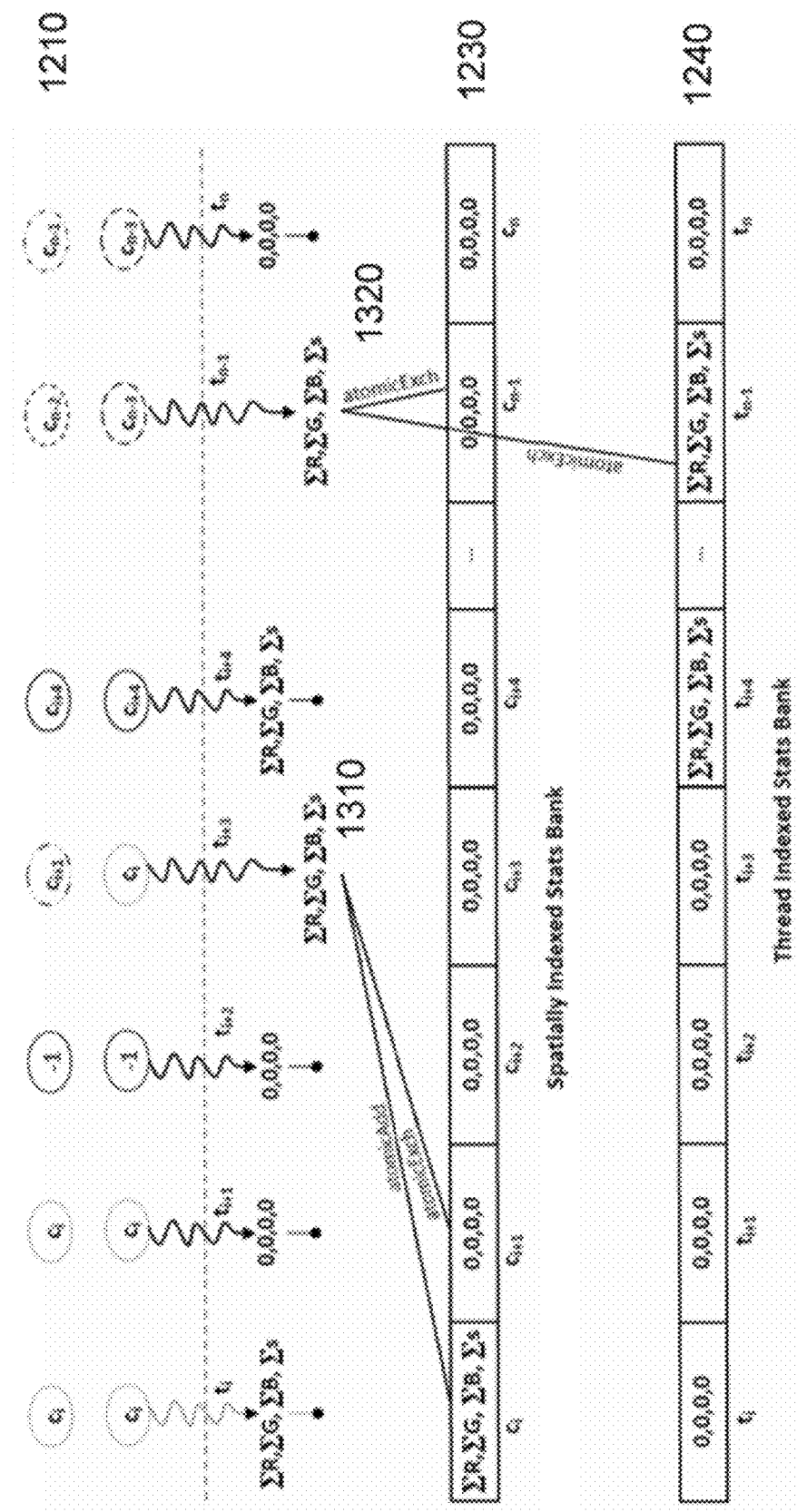
FIG. 13 depicts a statistics component of a linking kernel in accordance with an embodiment of the invention.
Figure 14:
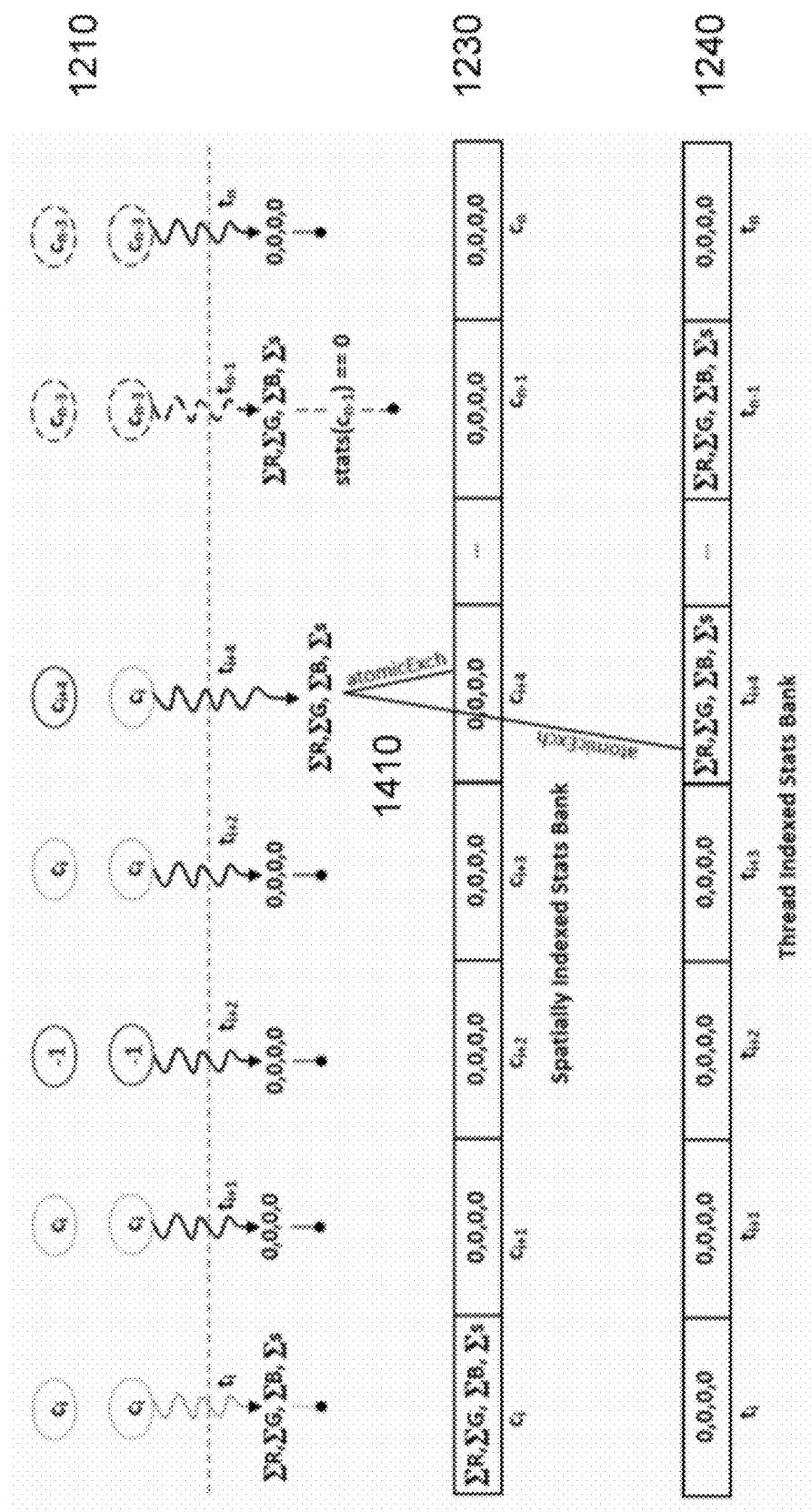
FIG. 14 depicts a statistics component of the refinement kernel in accordance with an embodiment of the invention.
Figure 15:
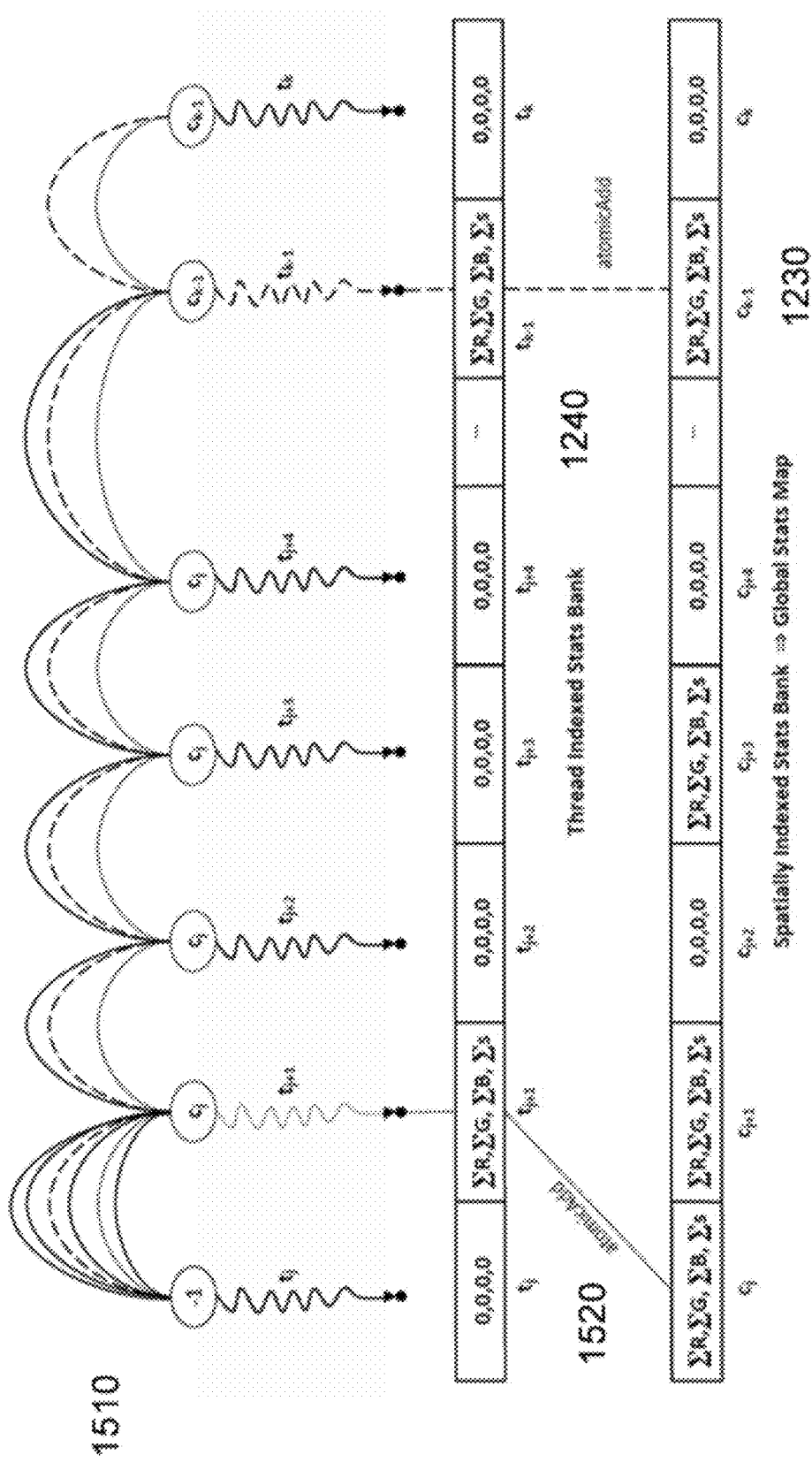
FIG. 15 depicts a global merge of a thread index and spatially indexed statistics buffers in accordance with an embodiment of the invention.

Because the initial cluster numbers are constrained by the spatial boundaries of the block, the initialization kernel will merge the spatial statistics on the block level. The integration of statistics components is integrated into, both, the linking and refinement steps, illustrated in FIG. 13. FIG. 13 depicts the statistics component of the linking kernel. As in FIG. 12, the cluster number of a given pixel is shown at 1210. However, the upper circle indicates the starting number and the circle indicated the linked number. 1310 and 1320 highlight the effect of spatial location on the merging of statistics. At 1310, a pixel merges with a segment whose statistics are located in the same spatial buffer 1230, allowing merging within the same buffer. The opposite case is shown at 1320, where the statistics are moved to the thread indexed buffer 1240. The refinement and linking kernels will hence update these statistics as the clusters merge using the secondary buffer. A final merge kernel will compact the secondary buffers across all blocks and merge the results with the primary spatial buffers to create a global statistics map, which is then integrated with the rest of the stereo algorithm, displayed in FIG. 14. FIG. 14 depicts the statistics component of the refinement kernel. Again, the initial and refined cluster number of a given pixel are shown at 1210. When a pixel is refined 1410, any stats remaining in the spatially indexed buffer 1230 are moved to the thread indexed buffer 1240. FIG. 15 depicts the global merge of the thread index and spatially indexed statistics buffers. At 1510, each thread loops through every cluster number in a given block. When a match is found 1420, the thread with the lowest index merges statistics global with the spatially indexed buffer.

Disparity Decomposition—The goal of disparity computation is to decompose the image into a series of surfaces that are present at different disparity values. The right, reference image $I_R$ is subtracted from a shifted version of the left image. However, instead of looking at per-pixel metrics, such as described in accordance with the prior art noted above, in accordance with an embodiment of the invention utilizes a segment-based disparity estimate, and tries to represent the best disparity value that is associated with a given segment.

In accordance with this embodiment of the invention, a left image $I_l$ is shifted one pixel at a time, while subtraction between left and right images is performed with the shifted versions of the left image. Every shift then represents a new disparity. The resulting set of difference images then constitutes a disparity decomposition of every segment in the image. Any zero-pixels represent regions (or segments) in the image that are candidates for the correct disparity. The computation of a difference image is presented as:

For any given segment Si, such that $S_i \subset S$,

For a given disparity, $d_{i,S}$:

$$\{S_i\}_{n=1}^{\tilde{N}} \leftarrow \tilde{S}_i \qquad \text{Equation 6}$$

and $$I_D^{(d)}(x, y) = \max_{c \in \{R,G,B\}} (|I_R(x, y) - I_L(x-d, y)| \le \tau_c)$$

such that:

$$(x, y) \in \{(x_0, y_0), (x_1, y_1), \ldots, (x_N, y_N)\}$$

Where d denotes the current shift, and $\tau_c$ is the threshold that is associated with a current color channel.

So, $\tilde{N} \subseteq N$

For any given segment, disparity decomposition is a means of reducing the candidate disparity values that can be associated with the segment (based on a similarity metric). The goal is to determine a disparity that best matches a given segment. A similarity metric is used in which the total number of overlapping pixels can zero out regions in the segment during the subtraction phase of disparity decomposition. For a given disparity, the more pixels in the segment that are zeroed out, the closer the segment is to the correct disparity. The similarity metric for estimating segment disparity is given by:

$$\tilde{d}_{i,S} = \underset{D}{\mathrm{argmax}} \tilde{S}_i(x, y, d) \qquad \text{Equation 7}$$

Where $\tilde{D}_{i,S}$, represents the disparity estimate for a given segment S, and $\tilde{S}_i(x,y,D)$ represents the portion of the segment that is present at step D, in a given disparity decomposition step. Every segment in the image can be considered a sequence that is comprised of the reference image's pixels, such that $\{s_n\}_{n=1}^{N}$ where N is the size of the segment in the reference image. For a given disparity, we can define a subsequence $\{\tilde{s}_n\}_{n=1}^{\tilde{N}_D}$, for a given disparity, D, such that $\tilde{s}_n$ is a subsequence of $\{s_n\}_{n=1}^{N}$, and $N \ge \tilde{N}$.

The goal is to have $s_n$ and $\tilde{s}_n$ overlap nearly entirely at one of the candidate disparity values. The appropriate disparity is estimated as one that maximizes the ratio of the subsequence, relative to its sequence. Equation 7 above can actually be represented as:

$$\tilde{D}_{i,S} = \underset{D}{\mathrm{argmax}} \frac{\tilde{N}_D}{N} \qquad \text{Equation 8}$$

Figure 16:
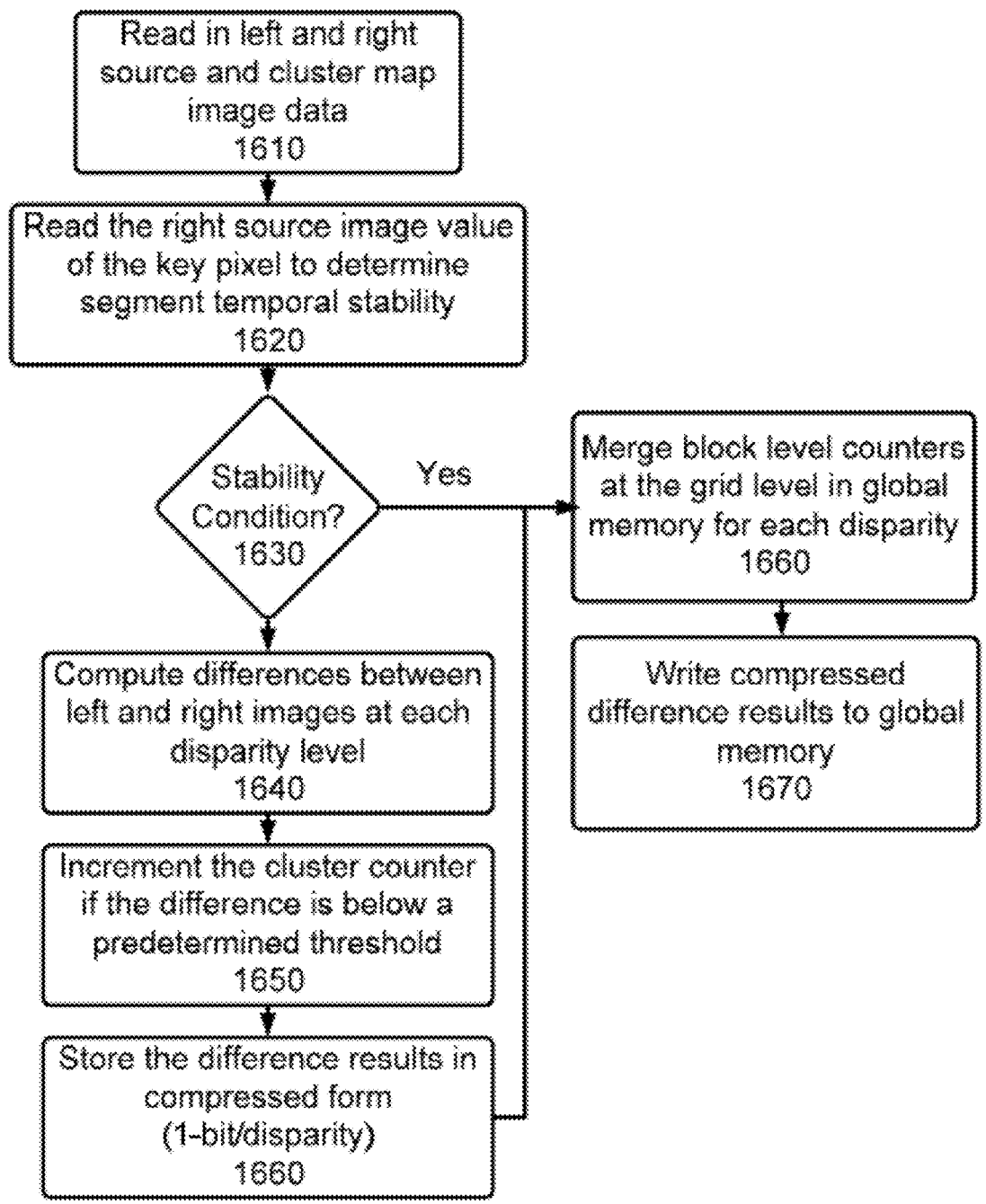
FIG. 16 provides an overview of a disparity decomposition algorithm in accordance with an embodiment of the invention.

FIG. 16 presents an overview of this disparity decomposition section. As is shown in FIG. 16, processing begins at step 1610 in which left and right source and cluster map image data is read in. Then, at step 1620 the right source image value of the key pixel is read to determine segment temporal stability. At step 1630 an inquiry is made as to whether the condition is stable. If the inquiry at step 1630 is answered in the affirmative, and it is therefore determined that a stability condition exists, processing continues at step 1660, where the block level counters are merged at the grid level in global memory for each disparity and combined globally across the entire image 1670 before compressing the resultant decomposition into an image with 1 bit allocated per disparity value.

If, on the other hand, the inquiry at step 1630 is answered in the negative, and it is therefore determined that a stability condition does not exist, processing then continues at step 1640 where differences between left and right images are computed at each disparity level. Next, at step 1650, a cluster counter is incremented if the difference computed in step 1640 is below a predetermined threshold determined empirically. Then, at step 660, these difference results are stored in a compressed form, comprising (1-bit/disparity). So, for 32 disparity values, a 32-bit image is used. For 64 disparity values, a 64-bit image is used, and so on.). Finally, processing then passes to step 1660 as described above.

Violating the Subsequence Criterion—The rule, of looking at similarity as an overlap ratio, based on a number of spatiotemporal criteria, presented above can be violated in a number of special cases. For instance, this can happen if a smaller segment undergoing disparity decomposition overlapped a much larger segment with similar spatial characteristics. For such a case, penalizing the non-overlapped region would present one means of mitigating such a problem. Another case can occur if such a segment belongs to a textured pattern, occurring at a spatially periodic setting. In this case, agglomeratively growing the regions (see earlier section on segmentation) would present a possible solution. Then, textured regions would cluster together before disparity decomposition occurs (see section below on disparity estimation of textured regions).

Implementation in CUDA—To accomplish disparity decomposition in accordance with the various embodiments of the invention, an efficient shift-difference kernel may be implemented, as will be shown below. Each block may read one row of source image data to shared memory. As a result, the difference between left and right image pixels can be computed for several disparities at once because all of the necessary data is available in shared memory. Because only one bit is necessary to store the result of the threshold on the difference result, the results can be compressed into a single 32-bit image in which each pixel contains the results from all disparities. This inventive method not only reduces storage requirements, but also reduces the number of required read/write operations on global memory. An extension of this method can be used to encode 64 bits or 128-bit disparity differences, stored in a 64 or 128-bit image.

The block may be preferably organized in three dimensions with the z-dimension representing the disparity. To maximize performance, the size of shared memory may preferably be kept under 4 KB to allow up to four blocks to be swapped out per streaming multiprocessor (SM). Depending on the GPU (or APU), shared memory may differ. In a particular exemplary implementation, the size of the z-dimension will be set to eight and each thread will calculate the difference for four disparity values in a loop if the maximum disparity is set to 32. The results of the differencing operation are stored in shared memory at the end of each iteration, per the description of disparity decomposition that was presented earlier. After all iterations have been executed, the final 32-bit values will be written to Global Memory, as a disparity image $I_D(x, y)$. For larger images, the size of the z-dimension may be reduced to maintain the size of the shared memory used per block.

Figure 17:
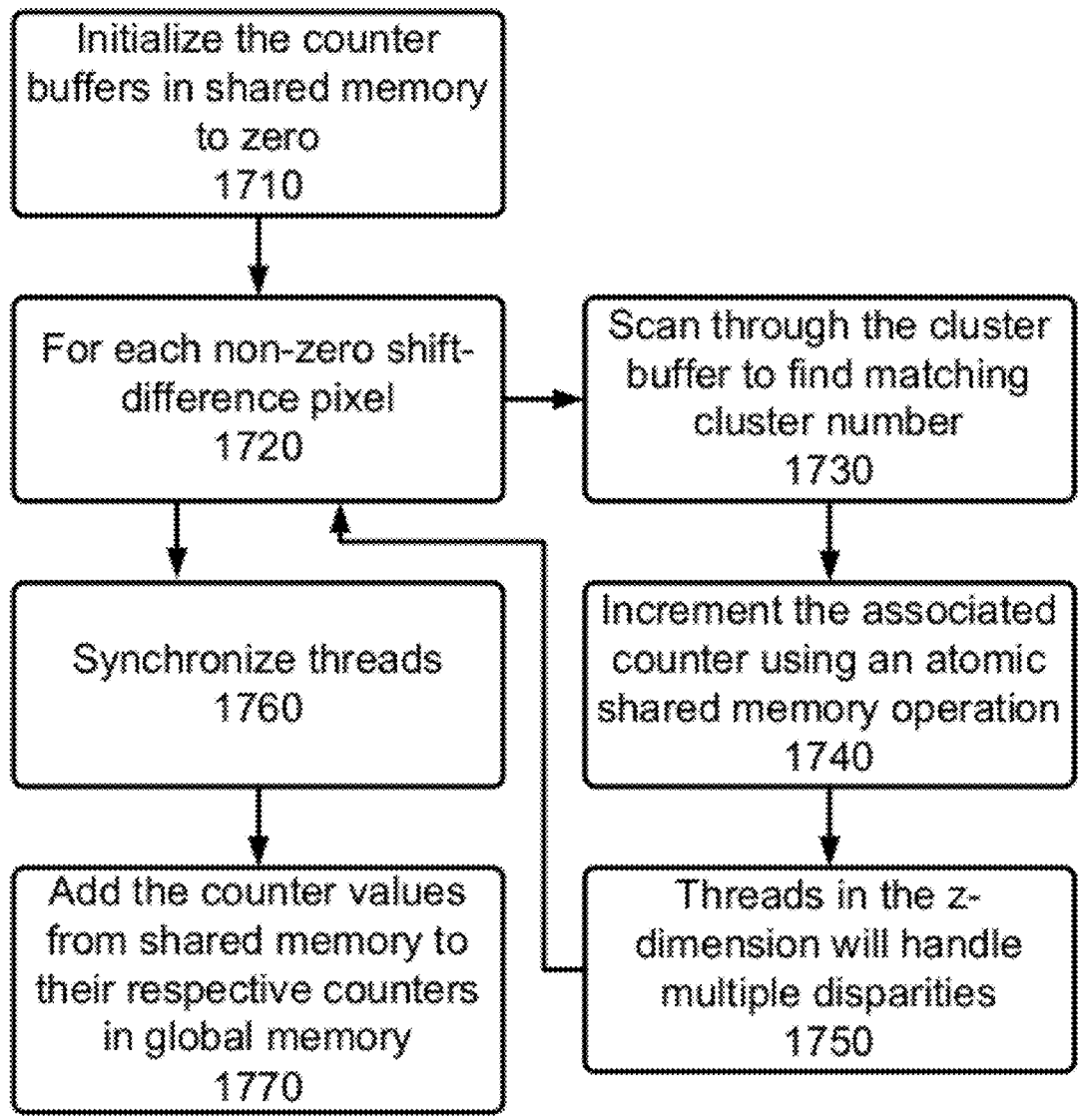
FIG. 17 expands the counting component of disparity decomposition, depicting the accumulation of overlapping pixels in shared memory in accordance with an embodiment of the invention.

In addition to computing the difference between the source images, these intersection pixels are preferably counted with respect to the clusters in the left and right images to determine how much of each cluster in one image intersects with clusters in the other image. FIG. 17 presents steps describe an implementation of such a counting algorithm, and expands the counting component of disparity decomposition, depicting the accumulation of overlapping pixels in shared memory. As is shown in FIG. 17, at a first step 1710, counter buffers in shared memory are initialized to zero. Then, starting at step 1720, for each non-zero shift-difference pixel perform steps 1730-1750. At step 1730 the buffer is scanned through to find a matching cluster number, and then at step 1730, the associated counter is incremented using an atomic shared memory operation. Finally, at step 1750, threads in the z-dimension handle multiple disparities. After each non-zero shift-difference pixel is addressed at step 1720, processing passes to step 1760 where the various threads are synchronized. Finally, at step 1770, the counter values from the shared memory are added to their respective counters in global memory.

Figure 18:
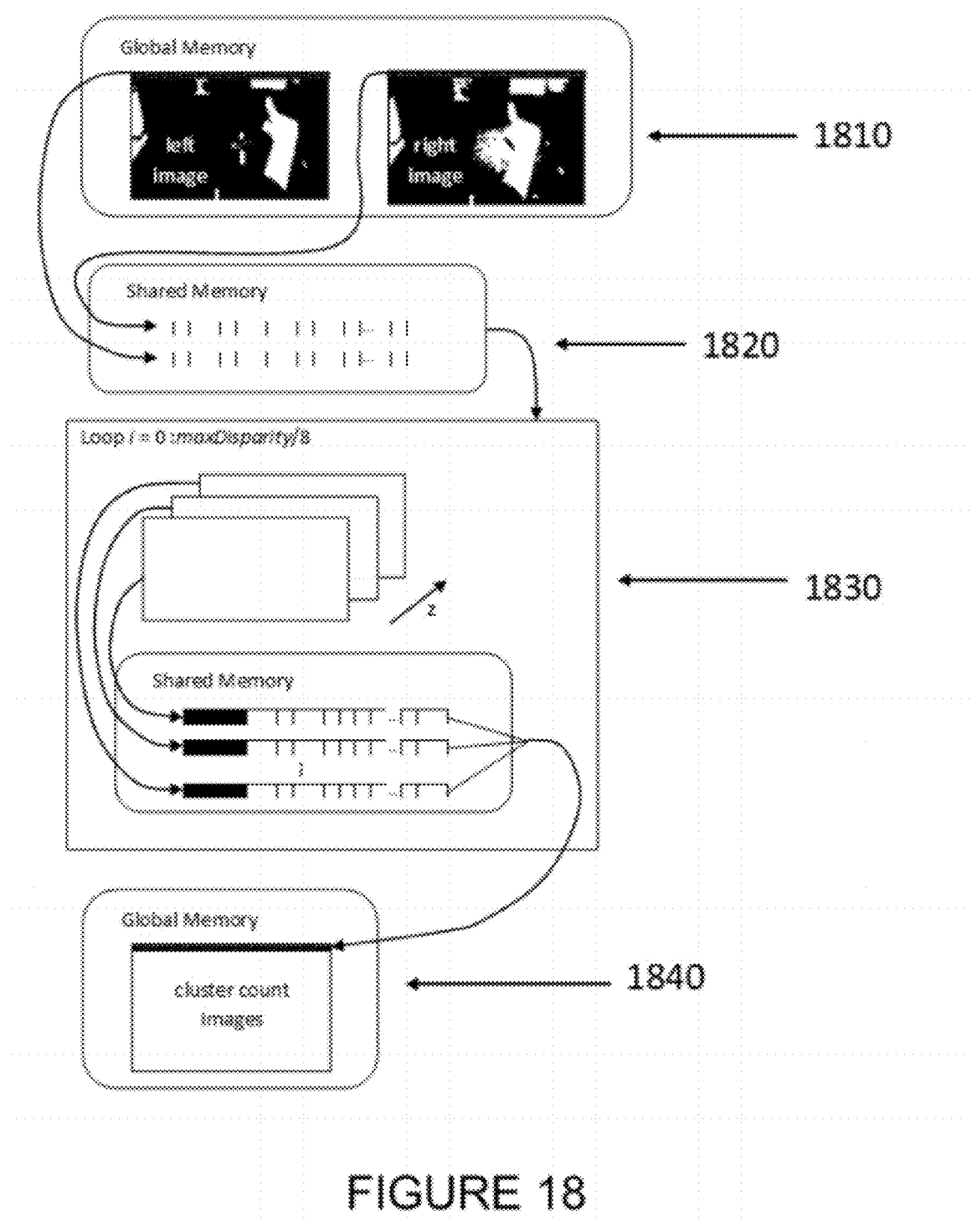
FIG. 18 outlines an implementation of disparity decomposition in CUDA in accordance with an embodiment of the invention.

A system in which the algorithm of FIG. 17 is implemented is shown in FIG. 18. As is set forth in FIG. 18, one row of left and right cluster map images 1810 are first read into shared memory 1820, each thread preferably handling four pixels. Then, at 1830 cluster numbers associated with the read in cluster map images are searched for in the shared memory buffer, 8 pixels being simultaneously searched for using threads in the z-dimension. If the cluster number is found, the count associated with that cluster number is incremented using atomic operations. Otherwise, the cluster number entry is added and the count associated with that cluster number is set to one. After all of the cluster map images are read in, the threads are synched so that all the threads are synchronized, preferably by a GPU or other appropriate processing element, during execution, effectively having all threads "wait" until every thread has finished its computation in a block or kernel. Finally at 1840 the current shared memory counts are added to the existing values in Global Memory.

The buffer containing the cluster numbers in the correct order will be copied to texture memory so it can quickly be accessed by all thread blocks.

Composite Disparity Real-time Analysis—In real-time, the pixel architecture is again utilized, such that preferably, only temporally unstable segments have their disparity computed. As such disparity decomposition is reduced to segment-disparity decomposition. The result is a composite disparity image, comprised of already temporally stable segments and the newly computed/merged temporally unstable segments, on which disparity decomposition has been attempted.

Disparity Estimation of Textured Regions-Texture Disparity "Emergence"—The inventive segmentation algorithm is capable of agglomeratively adjoining spatially disjoint regions through an inter-cluster criterion. Growing such inter-cluster region thresholds gradually through kernel iterations allows for combining multiple smaller clusters into one larger, disjoint cluster. The advantage is an ability to segment textured regions, which are characterized by spatially periodic regions (see earlier section on texture). Although these regions are clearly disjoint, they are actually easily assembled together after disparity decomposition. The best disparity estimates will solidly remain associated with the correct cluster. This is accomplished through an emergence of a texture pattern from its constituent primitives after disparity computation.

Figure 19:
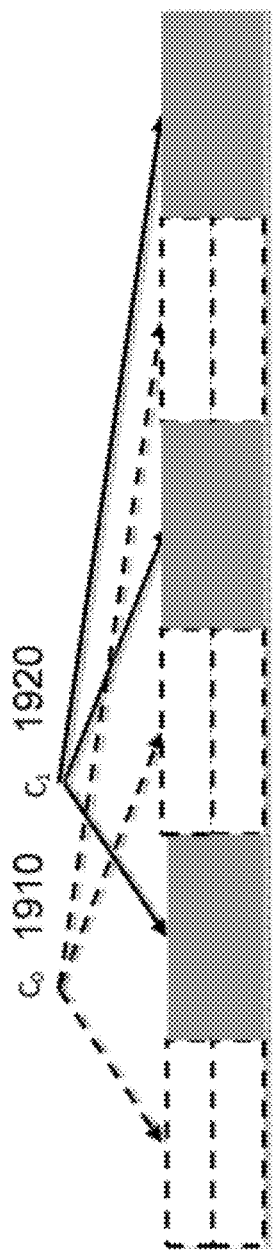
FIG. 19 illustrates a clustering of texture in accordance with an embodiment of the invention.

FIG. 19 depicts violating the spatial connectivity criterion in building apparently spatially disjoint objects as fundamental building blocks of texture where texture is composed of two clusters, 1910 and 1920. All the white blocks constitute one object 1910, although the individual blocks may themselves be regarded as objects. All the gray blocks constitute another object 1920.

Figure 21:
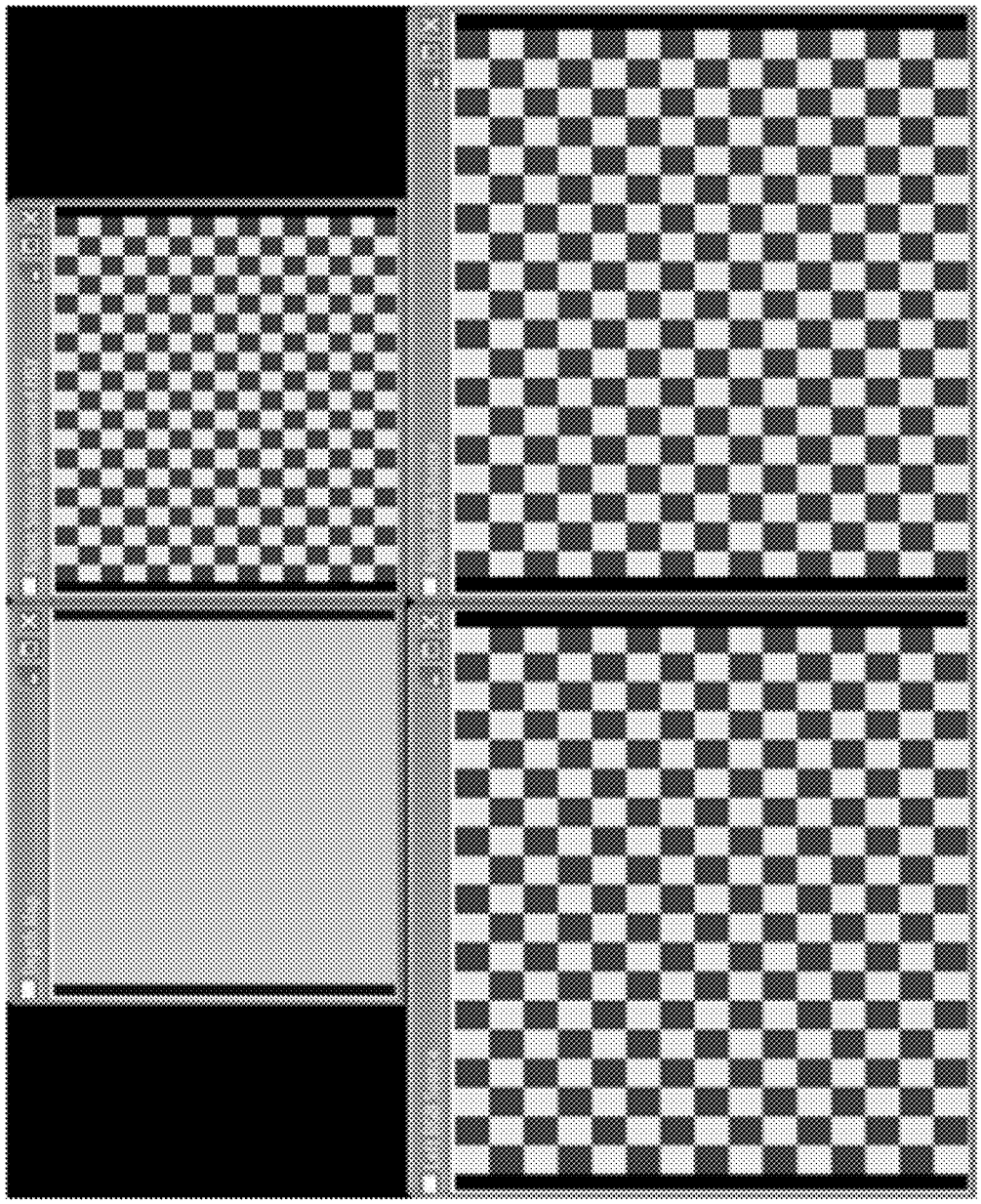
FIG. 21 displays results of disparity decomposition on a simulated texture region in accordance with an embodiment of the invention.

The concept of emergence in texture segmentation and the subsequent disparity computation is consistent with Gestalt psychology, or Gestaltism. In Gestalt theory, the brain is holistic, with self-organizing features, which, when combined together form more complex objects. As such, many Gestalt theorists argue that objects emerge from their constituent parts, hence the concept of emergence, presented by Metzger, noted above. In the inventive implementation of texture segmentation, a similar approach is adapted. The inventive approach to texture segmentation is Gestalt-inspired, and allows for this emergence of an object, such as those highlighted in FIGS. 20 and 21 from a number of constituent segments. FIG. 20 displays the results of disparity decomposition on a checkered texture, showing the input source images at 2010, the segmented source at 2020, and the disparity decomposition at 2030L and 2030R. FIG. 20 includes a disparity decomposition of a textured checkerboard sequence. Two segments are created (one for black squares and one for white ones). The disparity of both is estimated. In the disparity map, both objects have the same disparity computed. Different colors of the checkerboard form different clusters which appear at the same disparity. Texture "emerges" from this decomposition. FIG. 21 displays the results of disparity decomposition on a simulated texture region, showing the input source at 2110, the segmented source at 2120, and the disparity decomposition at 2130L and 2130R. FIG. 21 depicts two checkerboard sequences offset from each other by a disparity value (18 in this case). Again, the segmentation highlights two segments and after disparity computation they emerge as one object.

Both figures highlight a highly-textured region where conventional region-based and pixel-based disparity computation techniques perform poorly. In both images, a checkerboard sequence is estimated at the correct disparity. This is because the checkerboard sequence is really comprised of two objects representing all the white squares and all the black ones. Segmentation is first accomplished on the back and white squares separately. These squares are then agglomeratively adjoined to create larger white and black clusters. The disparities of each of the two objects is then computed. A depth-based clustering step is utilized to segment a foreground object that is highly textured, comprised of the entire checkerboard sequence.

Therefore, in accordance with various embodiments of the present invention, an algorithm for disparity computation that preferably runs on a GPU and other appropriate platforms, and performs very well in real-time conditions is presented. A residual compute portion of the algorithm reduces the FLOPs count dramatically, by exploiting a residual architectural component, and creating composite intermediate images for the segmentation as well as disparity computation. Texture is mitigated with a Gestalt-inspired technique that emphasizes the emergence of texture at the correct disparity by correctly estimating the disparities of its constituents. Examples of mitigating other chronic issues associated with region and pixel-based techniques have also been shown.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for generating a disparity map, comprising the steps of:
    segmenting a first reference image acquired at a first time into one or more segments, each segment comprising a plurality of pixels,
    segmenting a corresponding second reference image acquired at the first time into one or more segments, each segment comprising a plurality of pixels;
    determining a disparity for one or more segments between the first reference image and the corresponding second reference image by overlaying the first reference image on the second reference image and performing subtraction between at least one of the one or more segments in the first reference image and corresponding segments in the second reference image;
    generating a first disparity map based upon the subtraction between the first image and the corresponding second image;
    segmenting a third reference image acquired at a second time image into one or more segments, each segment comprising a plurality of pixels,
    segmenting a corresponding fourth reference image acquired at the second time into one or more segments, each segment comprising a plurality of pixels;
    determining one or more altered segments comprising a difference between one of the first and second images acquired at the first time and one of the corresponding third and fourth images acquired at the second time;
    determining a disparity only for the determined one or more altered segments between the third reference image and the corresponding fourth reference image;
    generating a disparity map update including the one or more determined disparities for the one or more altered segments between the third reference image and the corresponding fourth reference image;
    generating a composite disparity map by combining the disparity map update and the first disparity map; and
    generating a depth map from the composite disparity map.

2. The method of claim 1, wherein a determined disparity for a segment is assigned to all pixels in the segment.

3. The method of claim 1, wherein combining the disparity map update and the first disparity map further comprises the steps of:
    identifying one or more locations in the first disparity map corresponding to the determined one or more altered segments; and
    substituting for each identified location in the first disparity map a corresponding portion of the disparity map update.

4. A system for generating a disparity map, comprising:
    a camera for acquiring a first plurality of images at a first time and for acquiring a second plurality of corresponding images at a second time; and
    a processor for generating a first disparity map for at least two of the first plurality of images, determining one or more objects that change position between at least one of the first plurality of images and corresponding at least one of the second plurality of images, generating disparity map update segments corresponding to the determined objects, and combining the first disparity map and the disparity map update segments to generate a composite disparity map;
    wherein a determination of disparity between the at least two images acquired at the second time is performed only on portions thereof that have changed from one or more of the at least one images acquired at the first time.

5. The system of claim 4, wherein the camera is a stereo camera, and wherein the first and second plurality of images each comprise a left and a right image acquired by the stereo camera.

6. The system of claim 4, wherein the processor, when combining the first disparity map and the disparity map update segments, is further adapted to:
   - determine the position of the objects in the second plurality of images; and
   - replace these positions in the first disparity map with the corresponding disparity map update segments.

7. The system of claim 4, wherein the objects comprise portions of an image that have changed.

* * * * *